(12) United States Patent
Zhang et al.

(10) Patent No.: US 11,138,062 B2
(45) Date of Patent: Oct. 5, 2021

(54) TERMINAL DEVICE TROUBLESHOOTING METHOD AND TERMINAL DEVICE

(71) Applicant: HUAWEI TECHNOLOGIES CO., LTD., Shenzhen (CN)

(72) Inventors: Liang Zhang, Shanghai (CN); Yu Li, Beijing (CN); Chenxiao Zhao, Shenzhen (CN); Huijin Huang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/755,280

(22) PCT Filed: Oct. 13, 2017

(86) PCT No.: PCT/CN2017/106174
§ 371 (c)(1),
(2) Date: Apr. 10, 2020

(87) PCT Pub. No.: WO2019/071611
PCT Pub. Date: Apr. 18, 2019

(65) Prior Publication Data
US 2020/0241948 A1 Jul. 30, 2020

(51) Int. Cl.
*G06F 11/07* (2006.01)
*G06F 11/14* (2006.01)
*G06F 3/0482* (2013.01)

(52) U.S. Cl.
CPC ...... *G06F 11/0793* (2013.01); *G06F 11/0742* (2013.01); *G06F 11/0757* (2013.01); *G06F 11/1417* (2013.01); *G06F 3/0482* (2013.01)

(58) Field of Classification Search
CPC .............. G06F 11/0742; G06F 11/0736; G06F 11/0754; G06F 11/0757; G06F 11/0793;
(Continued)

(56) References Cited

U.S. PATENT DOCUMENTS 5,911,060 A * 6/1999 Elliott ................. G06F 11/1438
718/100
6,850,257 B1 * 2/2005 Colleran ............. G06F 11/1415
712/219

(Continued)

FOREIGN PATENT DOCUMENTS

CN 105373440 A 3/2016
CN 105868040 A 8/2016
(Continued)

OTHER PUBLICATIONS

Extended (Supplementary) European Search Report dated Oct. 14, 2020 issued in counterpart EP application No. 17928529.1. (9 pages).

(Continued)

*Primary Examiner* — Gabriel Chu
(74) *Attorney, Agent, or Firm* — Westerman, Hattori, Daniels & Adrian, LLP

(57) ABSTRACT

This application relates to the field of terminal technologies, and provides a terminal device troubleshooting method and a terminal device, so as to improve accuracy of a result of detecting a fault such as a black screen, or screen freezing that occurs on a terminal device. The troubleshooting method includes: obtaining, a first operation and a first result; determining that the first operation is the same as a predefined second operation and that the first result is a fault result; and when the first operation is the same as the second operation, and the first result is a fault result, determining that an actual fault occurs on a terminal device, where the first operation is an operation currently performed by a user on the terminal device, and the first result is a result of responding by the terminal device to the first operation.

20 Claims, 39 Drawing Sheets

(58) Field of Classification Search
CPC ............ G06F 11/1417; G06F 11/1438; G06F 11/1441; G06F 11/3013; G06F 3/048; G06F 3/0481; G06F 3/04812; G06F 3/0482; G06F 3/0487; G06F 3/0488; G06F 3/0489
See application file for complete search history.

(56) References Cited

U.S. PATENT DOCUMENTS

| | | | |
|---|---|---|---|
| 10,719,206 B1* | 7/2020 | Bura | G06F 40/143 |
| 10,754,753 B1* | 8/2020 | Cogley | G06F 11/1438 |
| 2003/0146884 A1* | 8/2003 | Heo | G09G 5/006 |
| | | | 345/30 |
| 2005/0257168 A1* | 11/2005 | Cummins | G06F 3/0481 |
| | | | 715/809 |
| 2006/0230321 A1* | 10/2006 | Cummins | G06F 11/0715 |
| | | | 714/46 |
| 2007/0016394 A1 | 1/2007 | Gaudette | |
| 2012/0144242 A1 | 6/2012 | Vichare et al. | |
| 2017/0242740 A1 | 8/2017 | Bell et al. | |
| 2019/0294490 A1 | 9/2019 | Zhang et al. | |

FOREIGN PATENT DOCUMENTS

| | | |
|---|---|---|
| CN | 106055472 A | 10/2016 |
| CN | 106598783 A | 4/2017 |
| CN | 107003929 A | 8/2017 |
| WO | 2016094009 A1 | 6/2016 |

OTHER PUBLICATIONS

Office Action dated Jul. 1, 2020, issued in counterpart CN Application No. 201780091268.2, with English translation (18 pages).
International Search Report dated Dec. 25, 2017, issued in counterpart application No. PCT/CN2017/106174, with English translation. (19 pages).
Office Action dated May 6, 2021, issued in counterpart CN Application No. 201780091268.2, with English Translation. (10 pages).

* cited by examiner

TERMINAL DEVICE TROUBLESHOOTING METHOD AND TERMINAL DEVICE

CROSS-REFERENCE TO RELATED APPLICATIONS

This application is a National Stage of International Patent Application No. PCT/CN2017/106174, filed on Oct. 13, 2017, which is hereby incorporated by reference in its entirety.

TECHNICAL FIELD

This application relates to the field of terminal technologies, and in particular, to a terminal device troubleshooting method and a terminal device.

BACKGROUND

With continuous development of terminal technologies, applications for terminal devices equipped with display screens and touchscreens, for example, mobile phones, keep increasing. In an application process of the mobile phone, a fault such as a black screen or screen freezing may usually occur on the mobile phone.

At present, whether a fault such as a black screen or screen freezing occurs on a mobile phone may be detected by comparing whether content displayed on a display screen of the mobile phone changes within a specific time. One detection method is to divide the display screen of the mobile phone into a plurality of regions, randomly select some regions from the plurality of regions, and compare whether content displayed in these regions changes within a specific time, to detect whether a fault such as a black screen or screen freezing occurs on the mobile phone. For example, if the content displayed in these regions changes within the specific time, it may be considered that a black screen or screen freezing does not occur on the mobile phone; or if the content displayed in these regions does not change within the specific time, it may be considered that a black screen or screen freezing occurs on the mobile phone.

However, in the foregoing method, the some regions are randomly selected from the plurality of regions, and it is likely that the content displayed in the randomly selected regions cannot represent content displayed on the entire display screen of the mobile phone. Therefore, this may lead to inaccuracy of a result of detecting a black screen or screen freezing that occurs on the mobile phone.

SUMMARY

This application provides a terminal device troubleshooting method and a terminal device, so as to improve accuracy of a result of detecting a fault such as a black screen or screen freezing that occurs on a terminal device.

To achieve the foregoing objective, the following technical solutions are used in this application.

According to a first aspect, a terminal device troubleshooting method is provided. A first operation currently performed by a user on a terminal device and a first result of responding by the terminal device to the first operation may be obtained; it is determined that the first operation is the same as a predefined second operation and that the first result is a fault result; and when the first operation is the same as the second operation, and the first result is a fault result, it is determined that an actual fault occurs on the terminal device.

In the terminal device troubleshooting method provided in this embodiment of this application, an operation (for example, the first operation) performed by the user on the terminal device and a result (for example, the first result) of responding by the terminal device to the operation can reflect an actual response status of the terminal device obtained when the user operates on the terminal device. Therefore, in this application, whether an actual fault occurs on the terminal device (in other words, whether a fault really occurs on the terminal device) is determined based on both the operation performed by the user on the terminal device and the result of responding by the terminal device to the operation. When a fault such as a black screen or screen freezing occurs on the terminal device, accuracy of a result of detecting the fault such as the black screen or screen freezing that occurs on the terminal device can be improved.

In a first optional implementation of the first aspect, after it is determined that an actual fault occurs on the terminal device, whether the user currently performs a third operation on the terminal device may be further detected; and when the user performs the third operation on the terminal device, it is further determined that the actual fault occurs on the terminal device. In this way, when the fault such as the black screen or screen freezing occurs on the terminal device, the accuracy of the result of detecting the fault such as the black screen or screen freezing that occurs on the terminal device can be further improved.

In a second optional implementation of the first aspect, a method for determining that the first result is a fault result may include: determining that the first result is the same as a predefined second result (the second result is a fault result of responding by the terminal device to the second operation performed by the user on the terminal device); and when the first result is the same as the second result, determining that the first result is a fault result. In this way, some fault results may be predefined to determine whether the first result of responding by the terminal device to the first operation currently performed by the user on the terminal device is a fault result.

In a third optional implementation of the first aspect, a method for determining that the first result is a fault result may include: determining that the first result is different from a predefined third result (the third result is a normal result of responding by the terminal device to the second operation performed by the user on the terminal device); and when the first result is different from the third result, determining that the first result is a fault result. In this way, some normal results may be predefined to determine whether the first result of responding by the terminal device to the first operation currently performed by the user on the terminal device is a fault result.

In a fourth optional implementation of the first aspect, in the terminal device troubleshooting method provided in this application, if it is determined that a suspected fault occurs on the terminal device before the first operation and the first result are obtained, it is determined that the actual fault that occurs on the terminal device is caused by the suspected fault. In this way, the terminal device can determine a specific cause of the actual fault, thereby improving fault detection accuracy and improving fault location accuracy for a developer.

In a fifth optional implementation of the first aspect, after it is determined that an actual fault occurs on the terminal device, whether the terminal device displays an interface of a first application program may be further determined when the suspected fault occurs on the terminal device; and when the terminal device displays the interface of the first application program, the first application program is forcibly closed, or when the terminal device does not display the interface of the first application program, an operating system of the terminal device is forcibly restarted. In this way, after the terminal device determines that a fault really occurs on the terminal device, the terminal device may perform restoration by itself, thereby improving stability of the terminal device.

In a sixth optional implementation of the first aspect, after it is determined that an actual faith occurs on the terminal device, an event that an actual fault occurs on the terminal device and a log that an actual fault occurs on the terminal device may be further sent to a server, so that the server analyzes a failure rate of the terminal device based on the event and the log.

In this application, after the server analyzes the failure rate of the terminal device, first, the server may display the failure rate to a manufacturer, so that the manufacturer may stipulate, based on the failure rate, a quality standard for terminal device quality measurement, and find more faults and possible operations; and second, the server may also display the failure rate to the developer, so that the developer can locate a fault that occurs on the terminal device, for example, the black screen or screen freezing, and resolve this problem. In this way, product quality of the terminal device can be improved.

According to a second aspect, a terminal device troubleshooting method is provided. An operation currently performed by a user on a terminal device may be obtained; it is determined that the operation is the same as a predefined reference operation; and when the operation is the same as the reference operation, and when it is determined that a suspected fault occurs on the terminal device before the operation is obtained, it is determined that an actual fault occurs on the terminal device.

In the terminal device troubleshooting method provided in this embodiment of this application, the operation currently performed by the user on the terminal device can restore the terminal device to normal, and therefore the user possibly performs the operation on the terminal device y when a fault really occurs on the terminal device. In, this way, if the operation that is currently performed by the user on the terminal device and that is obtained by the terminal device is the same as the predefined reference operation, and the terminal device determines that the suspected fault occurs on the terminal device before the user performs the operation on the terminal device, the terminal device may determine that an actual fault occurs on the terminal device (in other words, a fault really occurs on the terminal device). Therefore, when a fault such as a black screen or screen freezing occurs on the terminal device, accuracy of a result of detecting the fault such as the black screen or screen freezing that occurs on the terminal device can be improved.

In a first optional implementation of the second aspect, after it is determined that an actual fault occurs on the terminal device, an event that an actual fault occurs on the terminal device and a log that an actual fault occurs on the terminal device may be further sent to a server, so that the server analyzes a failure rate of the terminal device based on the event and the log.

In this application, after the server analyzes the failure rate of the terminal device, first, the server may display the failure rate to a manufacturer, so that the manufacturer may stipulate, based on the failure rate, a quality standard for terminal device quality measurement, and find more faults and possible operations; and second, the server may also display the failure rate to the developer, so that the developer can locate a fault that occurs on the terminal device, for example, the black screen or screen freezing, and resolve this problem. In this way, product quality of the terminal device can be improved.

According to a third aspect, a terminal device is provided. The terminal device may include an obtaining module and a determining module. The obtaining module is configured to obtain a first operation currently performed by a user on the terminal device and a first result of responding by the terminal device to the first operation; and the determining module is configured to determine that the first operation obtained by the obtaining module is the same as a predefined second operation and that the first result obtained by the obtaining module is a fault result; and when the first operation is the same as the second operation, and the first result is a fault result, determine that an actual fault occurs on the terminal device.

In a first optional implementation of the third aspect, the terminal device may further include a detection module. The detection module is configured to: after the determining module determines that an actual fault occurs on the terminal device, detect whether the user currently performs a third operation on the terminal device; and the determining module is further configured to: when the detection module detects that the user performs the third operation on the terminal device, further determine that the actual fault occurs on the terminal device.

In a second optional implementation of the third aspect, the determining module is specifically configured to determine that the first result obtained by the obtaining module is the same as a predefined second result (the second result is a fault result of responding by the terminal device to the second operation performed by the user on the terminal device); and when the first result is the same as the second result, determine that the first result is a fault result.

In a third optional implementation of the third aspect, the determining module is specifically configured to determine that the first result obtained by the obtaining module is different from a predefined third result (the third result is a normal result of responding by the terminal device to the second operation performed by the user on the terminal device); and when the first result is different from the third result, determine that the first result is a fault result.

In a fourth optional implementation of the third aspect, the determining module is further configured to: if determining that a suspected fault occurs on the terminal device before the obtaining module obtains the first operation and the first result, determine that the actual fault that occurs on the terminal device is caused by the suspected fault.

In a fifth optional implementation of the third aspect, the terminal device may further include a restoration module. The determining module is further configured to: after determining that an actual fault occurs on the terminal device, determine, when the suspected fault occurs on the terminal device, whether the terminal device displays an interface of a first application program, and the restoration module is configured to: when the determining module determines that the terminal device displays the interface of, the first application program, forcibly close the first application program, or when the determining module determines that the terminal device does not display the interface of the first application program, forcibly restart an operating system of the terminal device.

In a sixth optional implementation of the third aspect, the terminal device may further include a sending module. The sending module is configured to: after the determining module determines that an actual fault occurs on the terminal device, send, to a server, an event that an actual fault occurs on the terminal device and a log that an actual fault occurs on the terminal device, so that the server analyzes a failure rate of the terminal device based on the event and the log.

For detailed descriptions of technical effects of any one of the third aspect or the optional implementations of the third aspect, refer to the related descriptions of the technical effects of any one of the first aspect or the optional implementations of the first aspect. Details are not described herein again.

According to a fourth aspect, a terminal device is provided. The terminal device may include an obtaining module and a determining module. The obtaining module is configured to obtain an operation currently performed by a user on the terminal device; the determining module is configured to determine that the operation obtained by the obtaining module is the same as a predefined reference operation; and when the operation is the same as the reference operation, and when determining that a suspected fault occurs on the terminal device before the obtaining module obtains the operation, determine that an actual fault occurs on the terminal device.

In a first optional implementation of the fourth aspect, the terminal device may further include a sending module. The sending module is configured to: after the determining module determines that an actual fault occurs on the terminal device, send, to a server, an event that an actual fault occurs on the terminal device and a log that an actual fault occurs on the terminal device, so that the server analyzes a failure rate of the terminal device based on the event and the log.

For detailed descriptions of technical effects of any one of the fourth aspect or the optional implementations of the fourth aspect, refer to the related descriptions of the technical effects of any one of the second aspect or the optional implementations of the second aspect. Details are not described herein again.

According to a fifth aspect, a terminal device is provided. The terminal device may include a processor, a memory coupled to the processor, and one or more computer programs, where the one or more computer programs are stored in the memory, the one or more computer programs include a computer instruction, and when the computer instruction is executed by the processor, the processor is configured to obtain a first operation currently performed by a user on the terminal device and a first result of responding by the terminal device to the first operation; determine that the first operation is the same as a predefined second operation and that the first result is a fault result; and when the first operation is the same as the second operation, and the first result is a fault result, determine that an actual fault occurs on the terminal device.

In a first optional implementation of the fifth aspect, the processor is further configured to: after determining that an actual fault occurs on the terminal device, detect whether the user currently performs a third operation on the terminal device; and when the user performs the third operation on the terminal device, further determine that the actual fault occurs on the terminal device.

In a second optional implementation of the fifth aspect, the processor is specifically configured to determine that the first result is the same as a predefined second result (the second result is a fault result of responding by the terminal device to the second operation performed by the user on the terminal device); and when the first result is the same as the second result, determine that the first result is a fault result.

In a third optional implementation of the fifth aspect, the processor is specifically configured to determine that the first result is different from a predefined third result (the third result is a normal result of responding by the terminal device to the second operation performed by the user on the terminal device); and when the first result is different from the third result, determine that the first result is a fault result.

In a fourth optional implementation of the fifth aspect, the processor is further configured to: if determining, before obtaining the first operation and the first result, that a suspected fault occurs on the terminal device, determine that the actual fault that occurs on the terminal device is caused by the suspected fault.

In a fifth optional implementation of the fifth aspect, the processor is further configured to: after determining that an actual fault occurs on the terminal device, when the suspected fault occurs on the terminal device, determine whether the terminal device displays an interface of a first application program, and when the terminal device displays the interface of the first application program, forcibly close the first application program, or when the terminal device does not display the interface of the first application program, forcibly restart an operating system of the terminal device.

In a sixth optional implementation of the fifth aspect, the terminal device may further include a transmitter. The transmitter is configured to: after the processor determines that an actual fault occurs on the terminal device, send, to a server, an event that an actual fault occurs on the terminal device and a log that an actual fault occurs on the terminal device, so that the server analyzes a failure rate of the terminal device based on the event and the log.

For detailed descriptions of technical effects of any one of the fifth aspect or the optional implementations of the fifth aspect, refer to the related descriptions of the technical effects of any one of the first aspect or the optional implementations of the first aspect. Details are not described herein again.

In the first aspect, the third aspect, and the fifth aspect, the third operation may be an operation performed by the user on the terminal device to forcibly close an application program currently rim on the terminal device. In this way, when an actual fault occurs on the terminal device, the terminal device can restore to normal by forcibly closing the application program currently run on the terminal device.

Alternatively, the third operation may be an operation performed by the user on the terminal device to forcibly restart the operating system of the terminal device. In this way, when an actual fault occurs on the terminal device, the terminal device can restore to normal by forcibly restarting the operating system of the terminal device.

According to a sixth aspect, a terminal device is provided. The terminal device may include a processor, a memory coupled to the processor, and one or more computer programs, where the one or more computer programs are stored in the memory, the one or more computer programs include a computer instruction, and when the computer instruction is executed by the processor, the processor is configured to obtain an operation currently performed by a user on the terminal device; determine that the operation is the same as a predefined reference operation; and when the operation is the same as the reference operation, and when determining that a suspected fault occurs on the terminal device before the operation is obtained, determine that an actual fault occurs on the terminal device.

In a first optional implementation of the sixth aspect, the terminal device may further include a transmitter. The transmitter is configured to: after the processor determines that an actual fault occurs on the terminal device, send, to a server, an event that an actual fault occurs on the terminal device and a log that an actual fault occurs on the terminal device, so that the server analyzes a failure rate of the terminal device based on the event and the log.

For detailed descriptions of technical effects of any one of the sixth aspect or the optional implementations of the sixth aspect, refer to the related descriptions of the technical effects of any one of the second aspect or the optional implementations of the second aspect. Details are not described herein again.

In the second aspect, the fourth aspect, and the sixth aspect, the operation may be an operation performed by the user on the terminal device to forcibly close an application program currently run on the terminal device. Alternatively, the operation may be an operation performed by the user on the terminal device to forcibly restart an operating system of the terminal device.

For detailed descriptions of technical effects of the operation, refer to the related descriptions of the technical effects of the third operation. Details are not described herein again.

In the first aspect to the sixth aspect, the actual fault that occurs on the terminal device is the black screen or screen freezing on the terminal device. According to the terminal device troubleshooting method provided in this application, when the actual fault that occurs on the terminal device is the black screen or screen freezing on the terminal device, accuracy of detecting the fault that occurs on the terminal device can be improved.

According to a seventh aspect, a computer readable storage medium is provided. The computer readable storage medium includes a computer instruction. When the computer instruction is run on a terminal device, the terminal device is enabled to perform the troubleshooting method according to any one of the first aspect or the optional implementations of the first aspect, or any one of the second aspect or the optional implementations of the second aspect.

According to an eighth aspect, a computer program product including a computer instruction is provided. When the computer program product is run on a terminal device, the terminal device is enabled to perform the troubleshooting method according to any one of the first aspect or the optional implementations of the first aspect, or any one of the second aspect or the optional implementations of the second aspect.

For detailed descriptions of technical effects of the seventh aspect and the eighth aspect, refer to the related descriptions of the technical effects of any one of the first aspect or the optional implementations of the first aspect, or any one of the second aspect or the optional implementations of the second aspect. Details are not described herein again.

BRIEF DESCRIPTION OF DRAWENGS

Figure 6A:
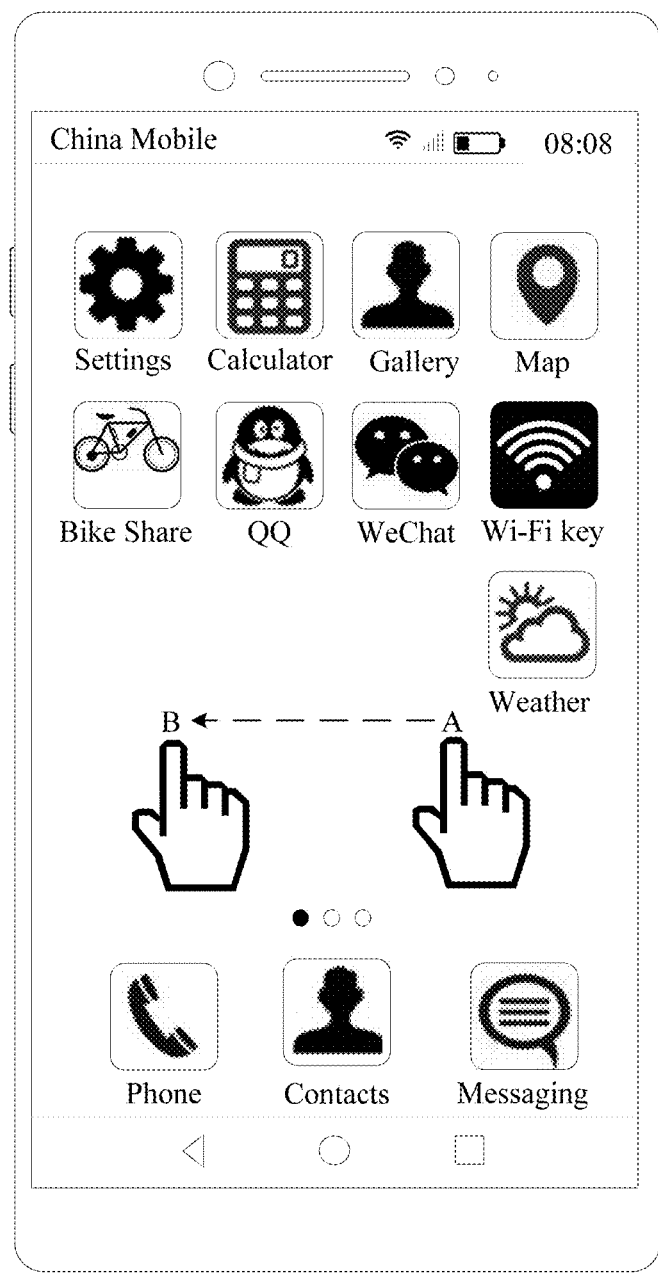
Figure 6B:
Figure 6C:
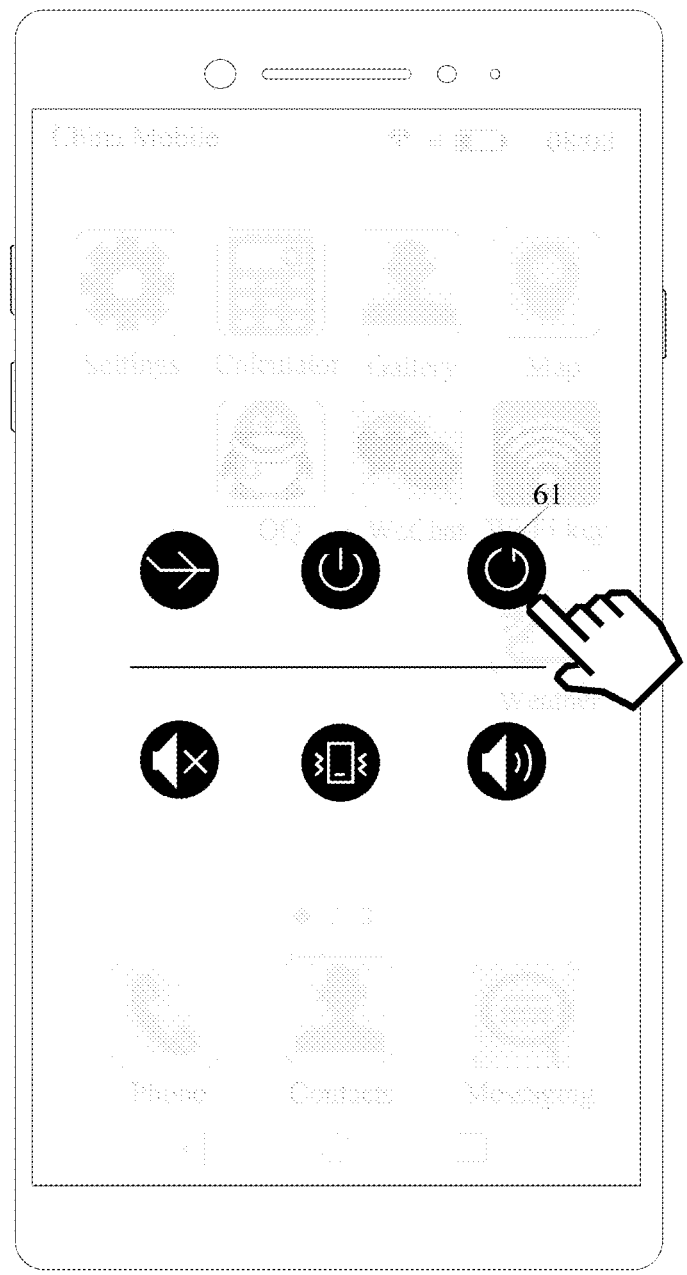
Figure 7A:
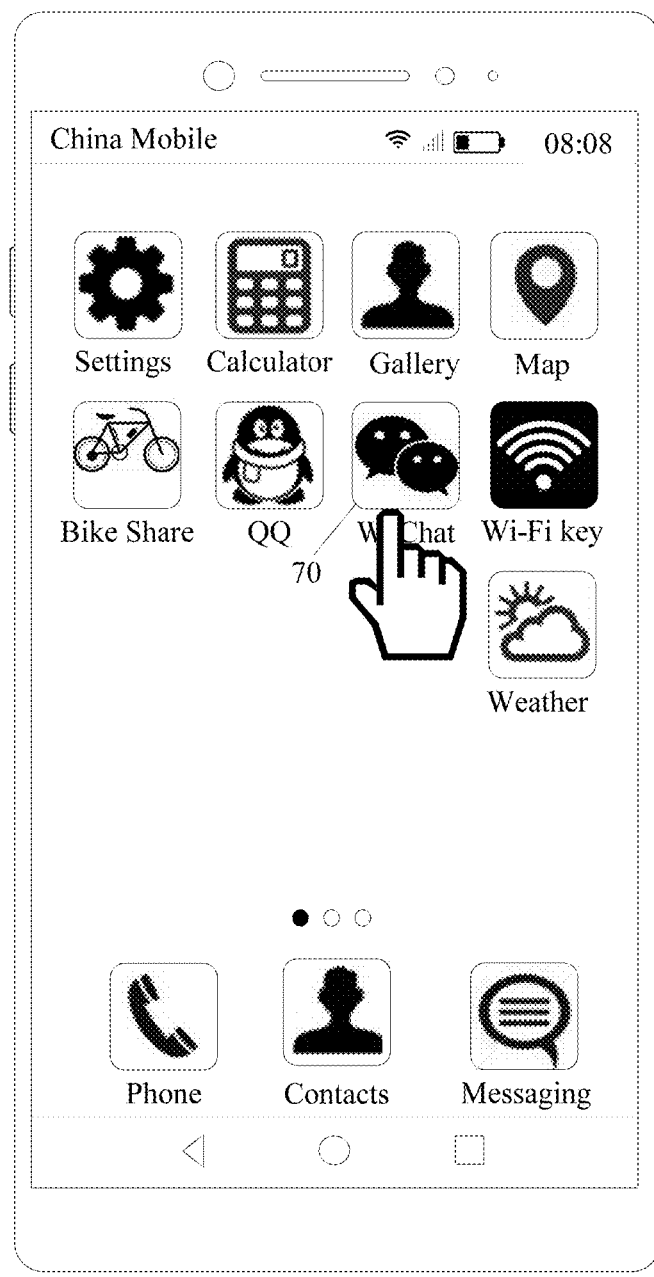
Figure 7B:
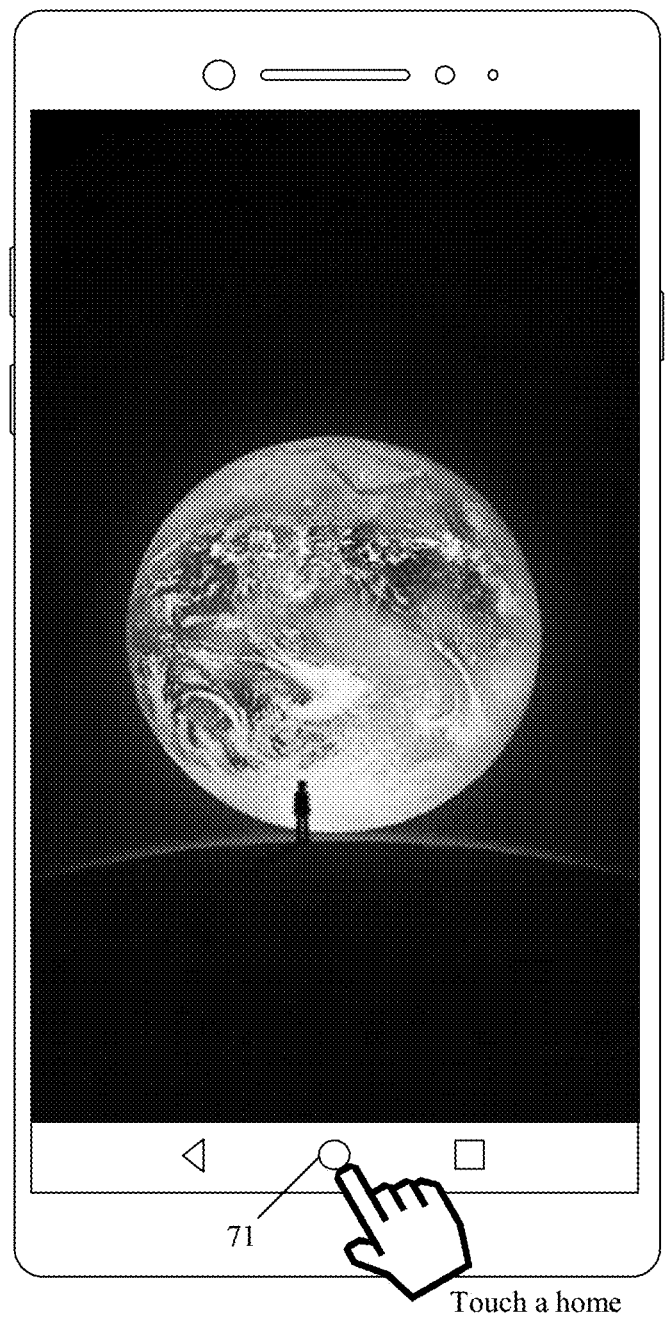
Figure 7C:
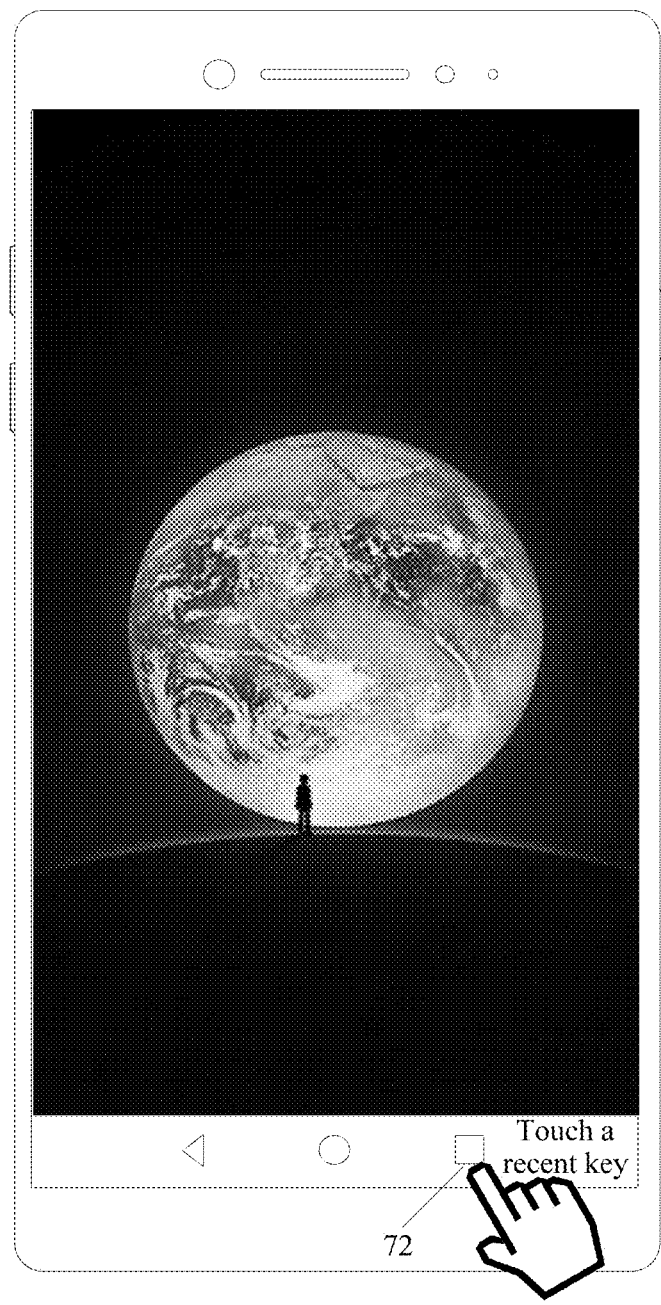
Figure 8A:
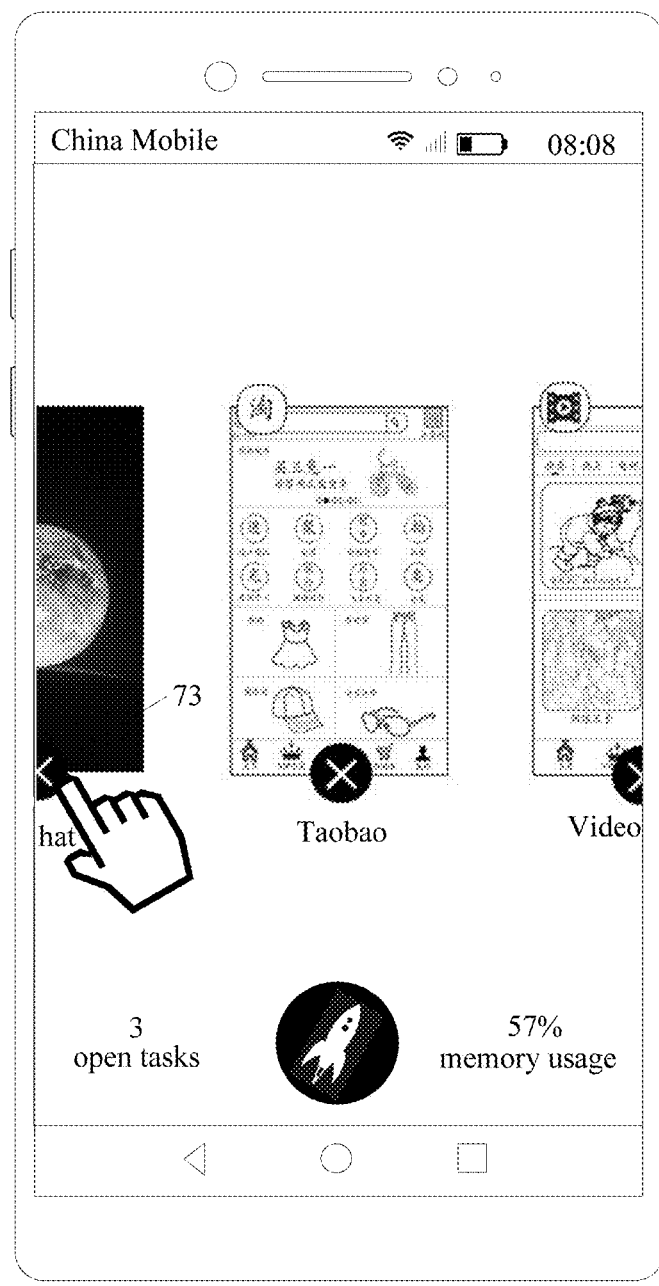
Figure 8B:
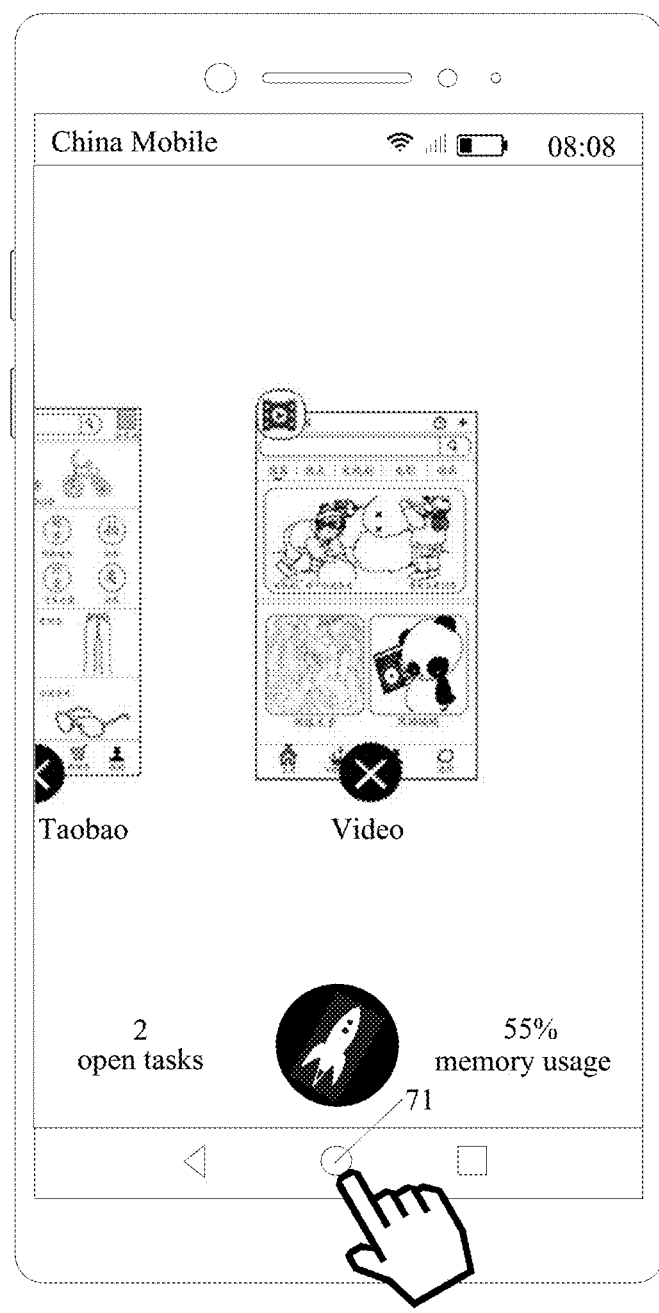
Figure 9A:
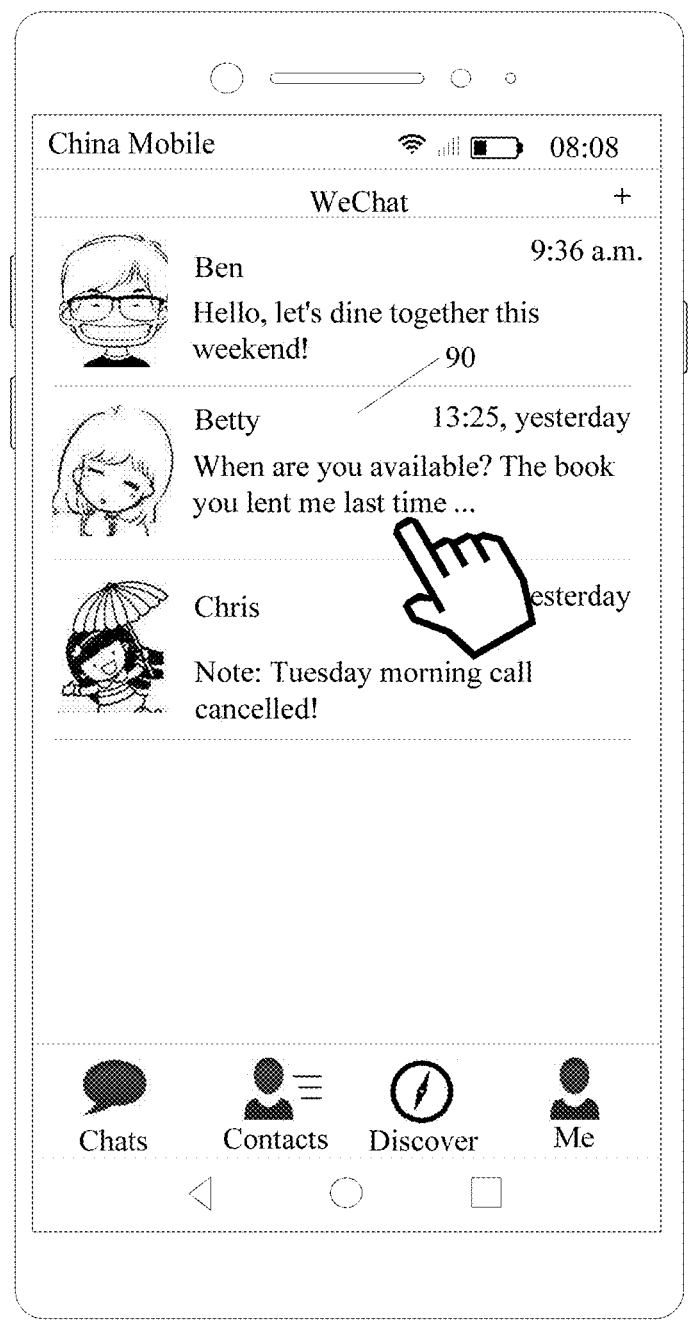
Figure 9B:
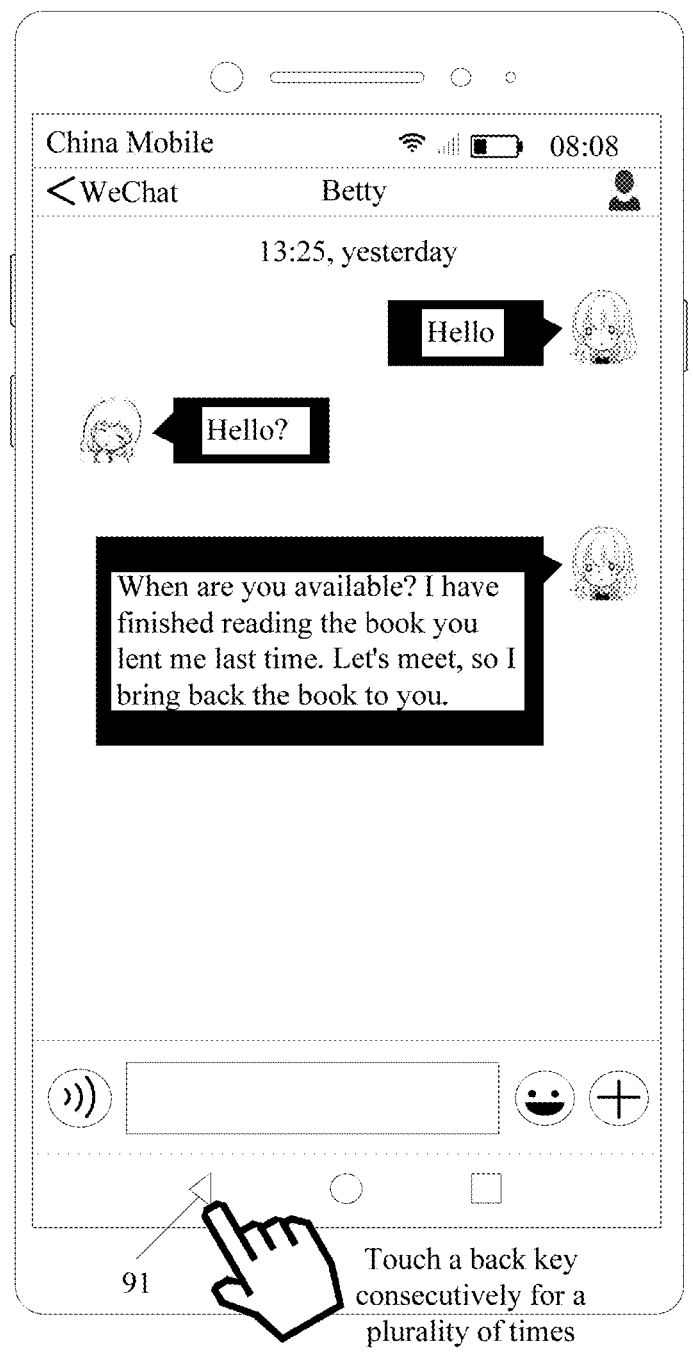
Figure 9C:
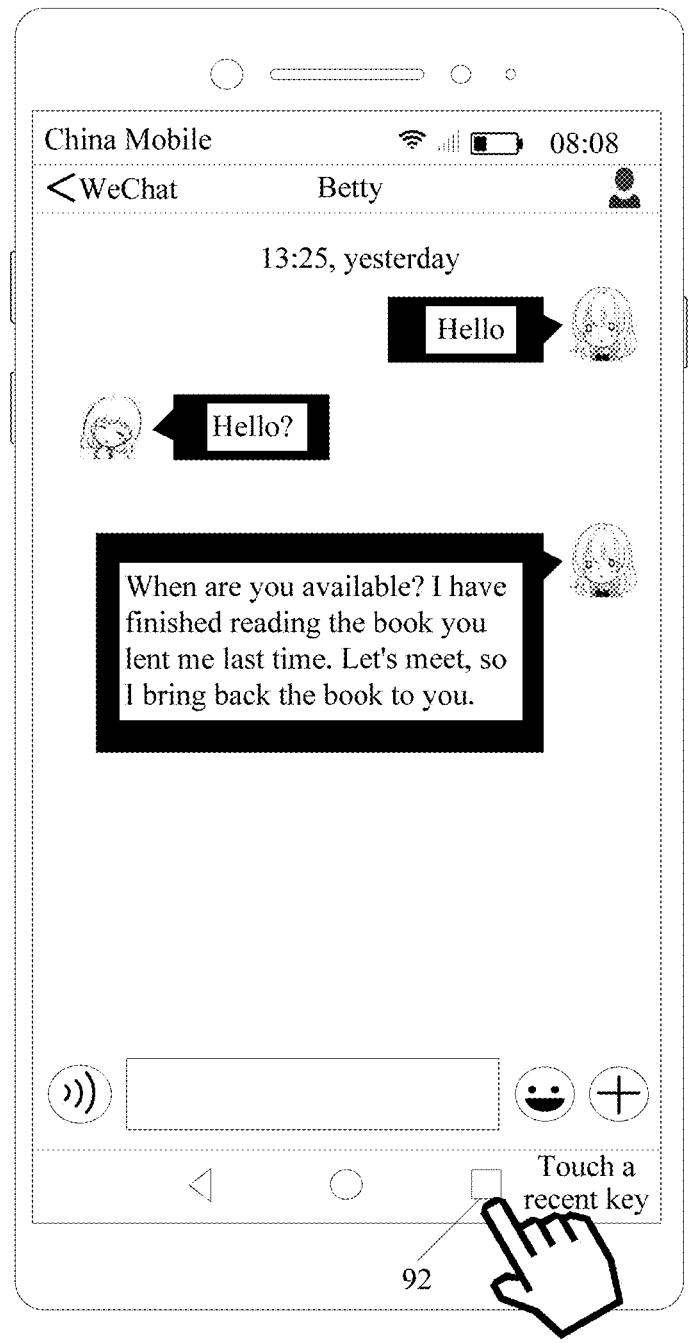
Figure 10A:
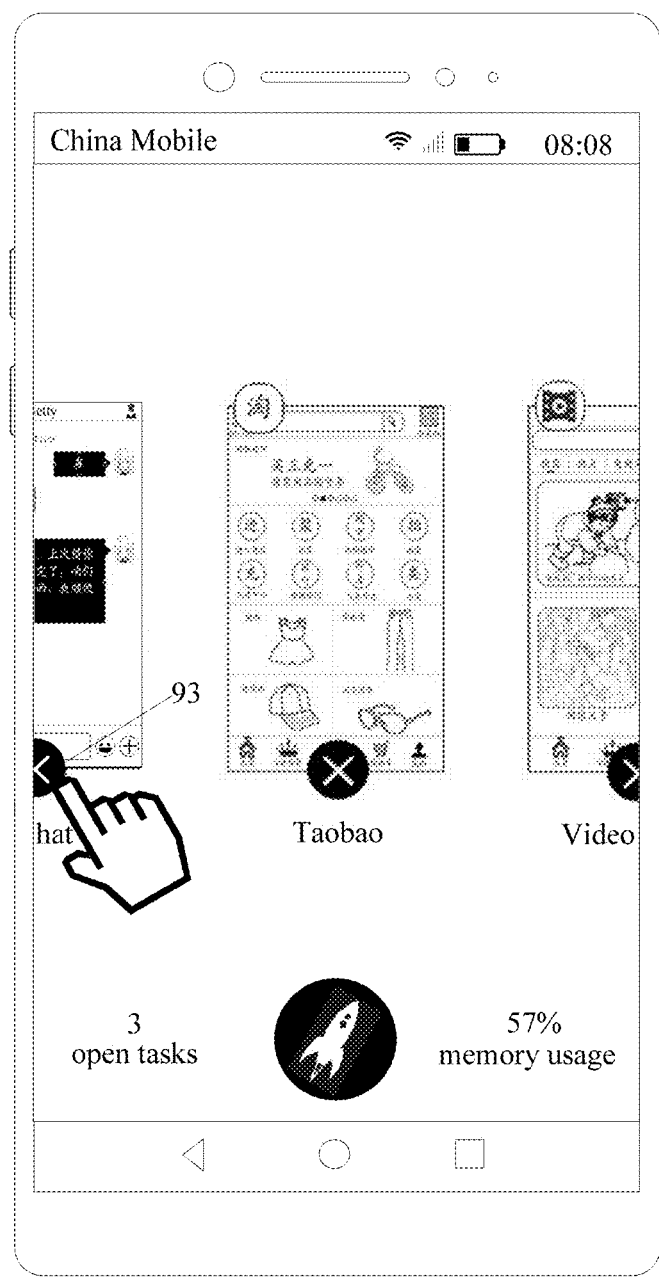
Figure 10B:
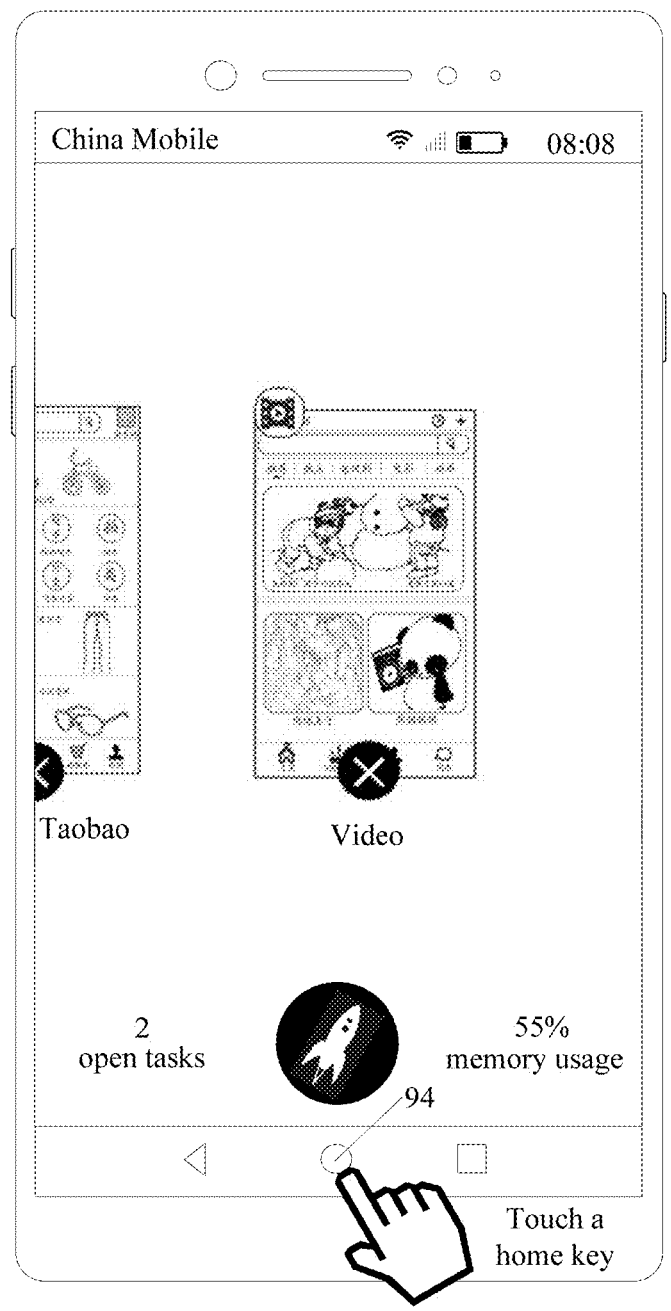
Figure 10C:
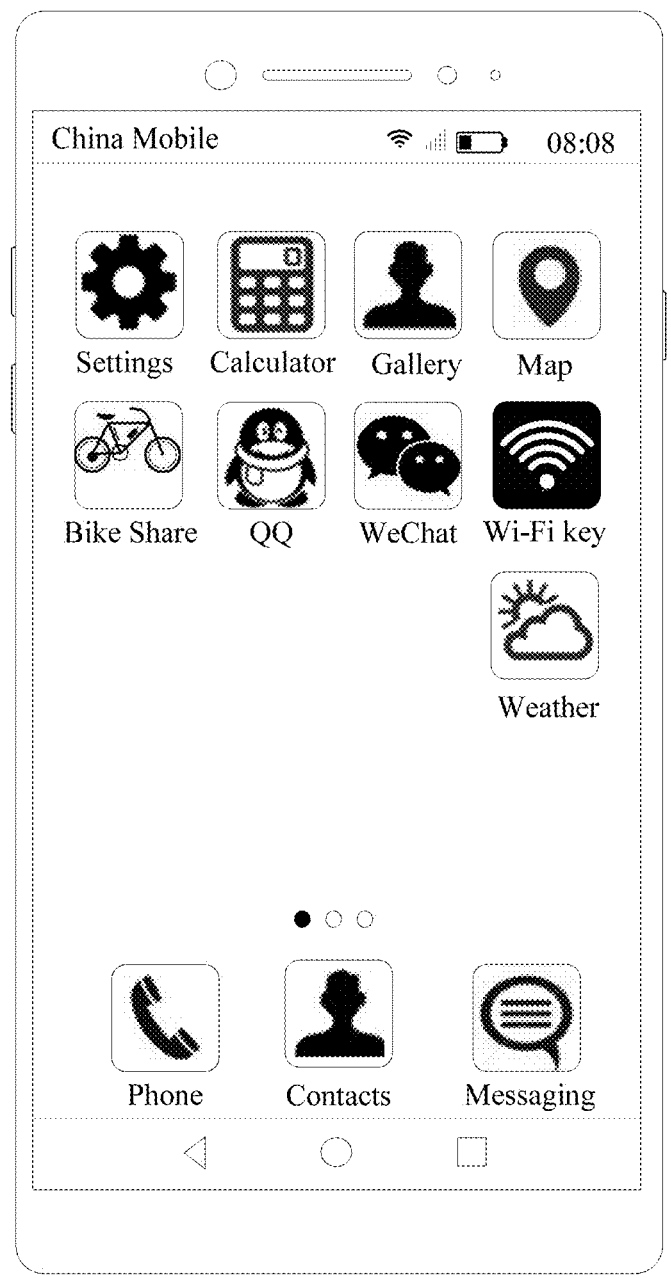
Figure 11A:
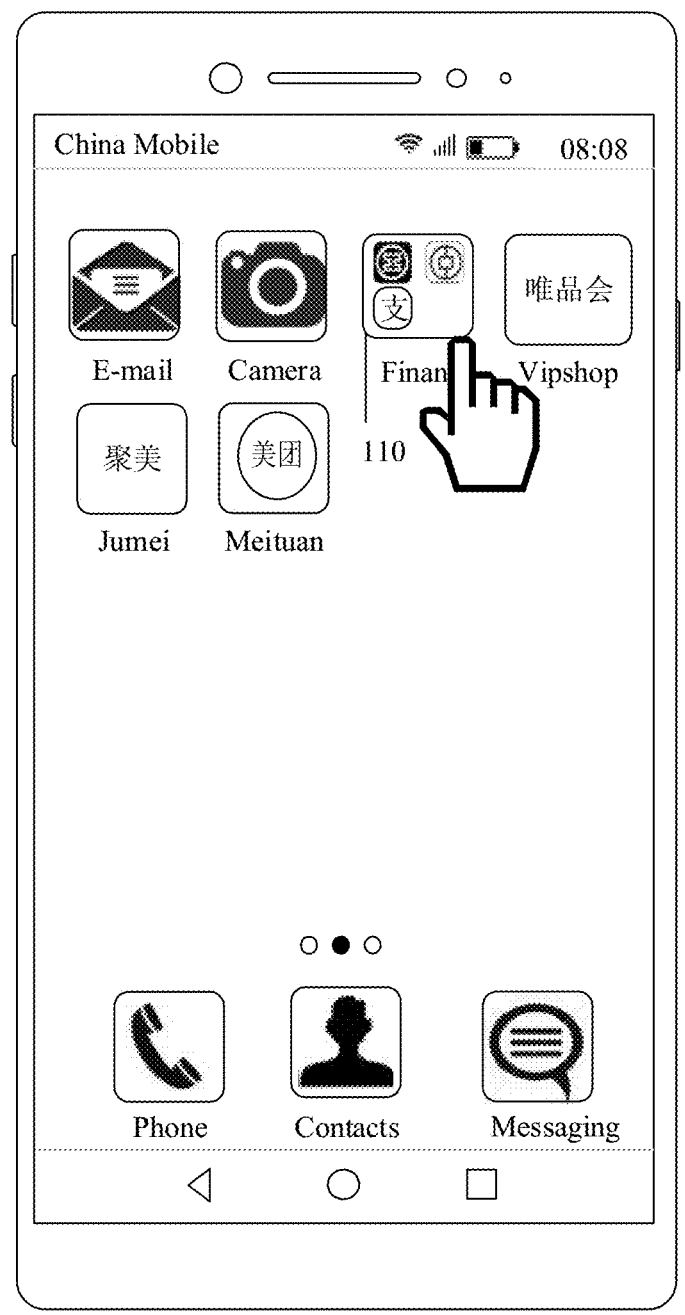
Figure 11B:
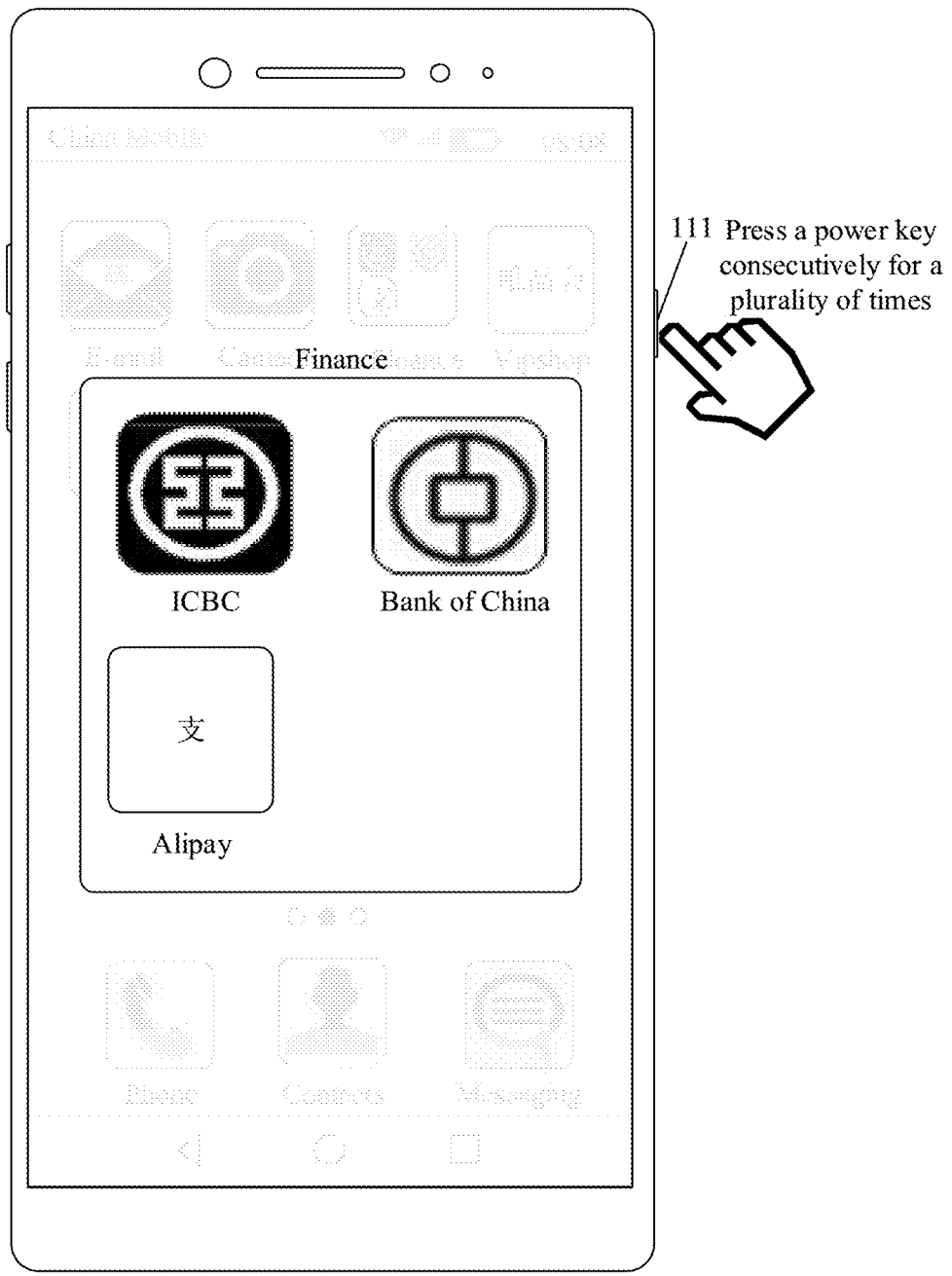
Figure 12A:
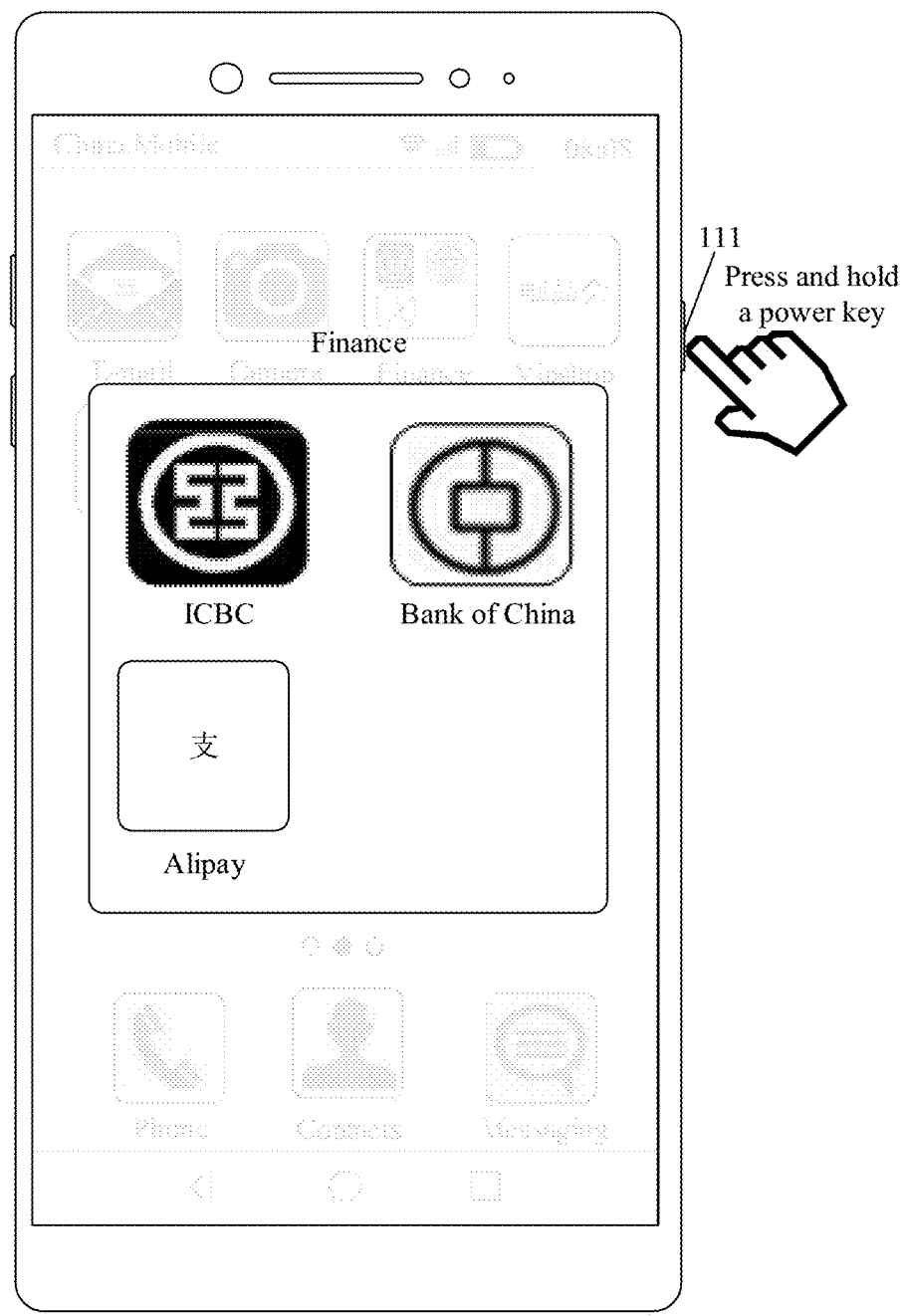
Figure 12B:
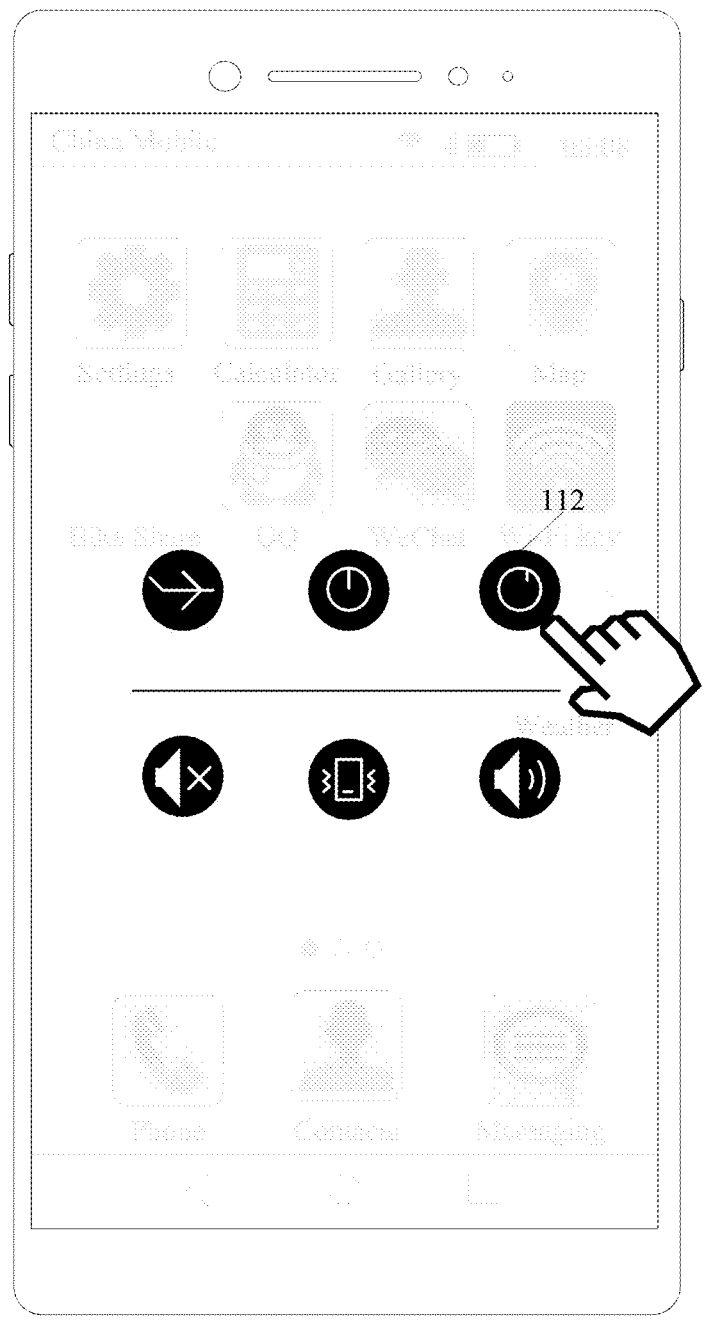
Figure 13:
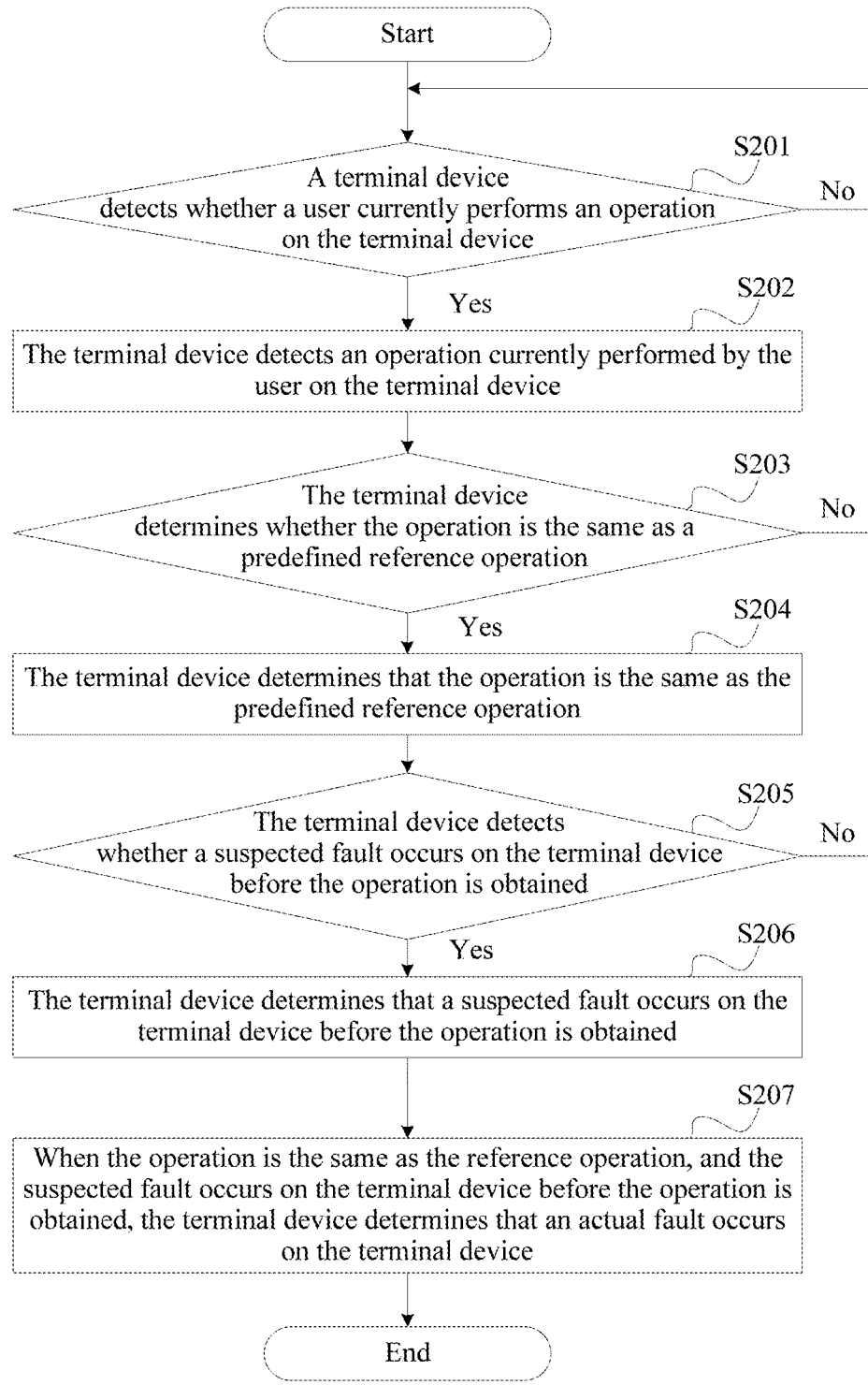
Figure 14A:
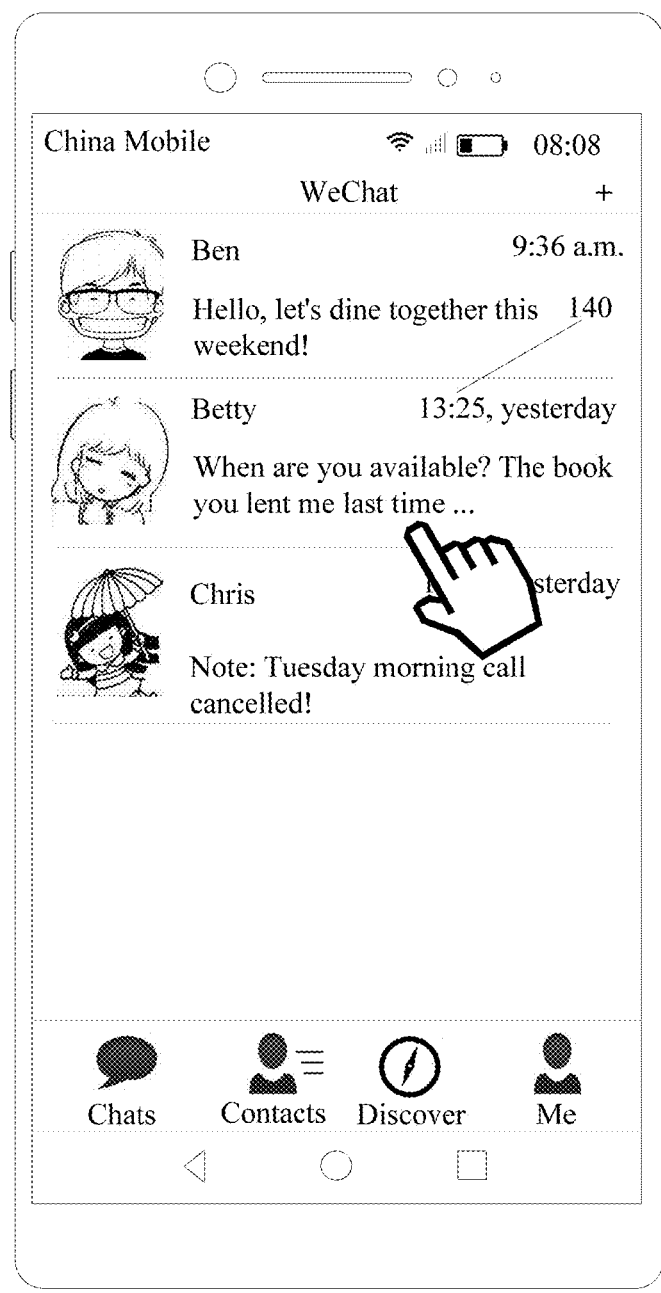
Figure 14B:
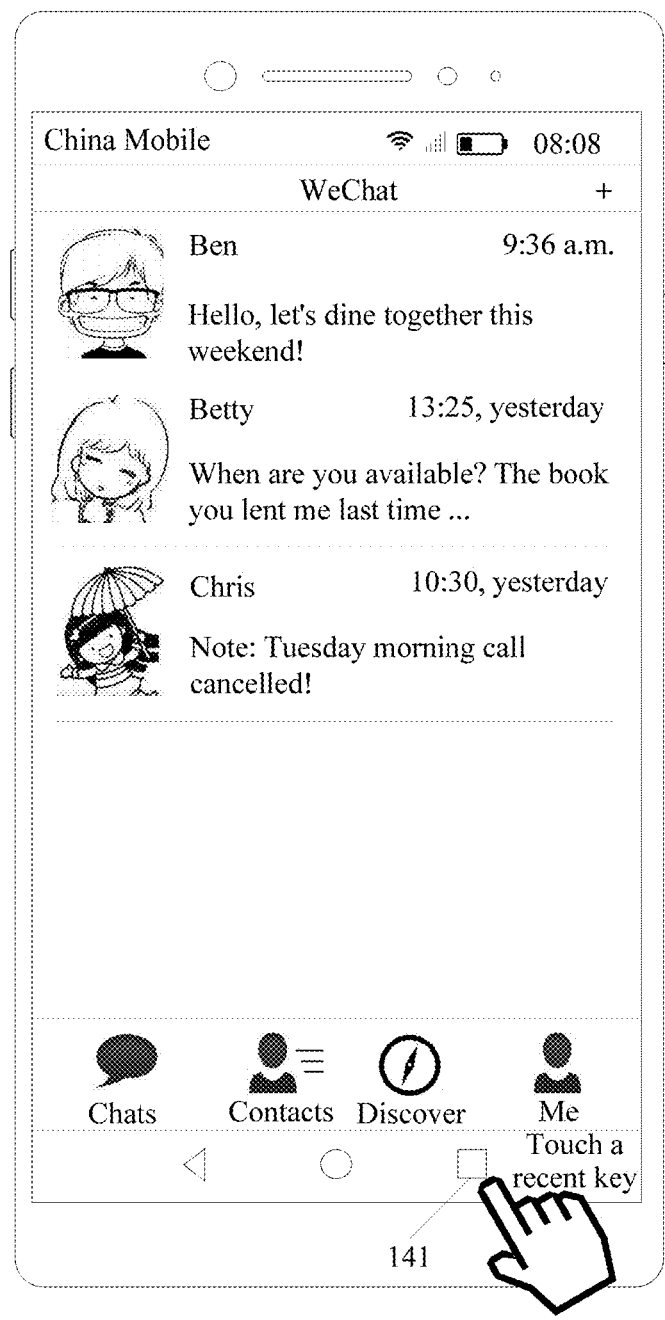
Figure 14C:
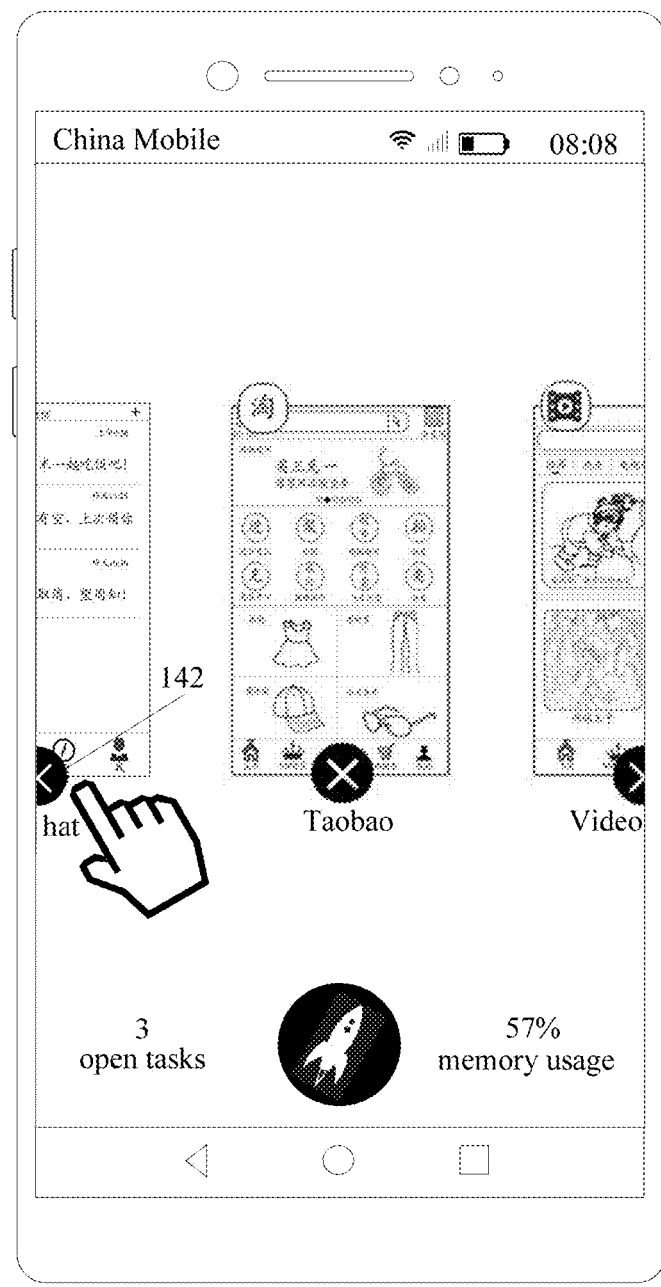
Figure 15A:
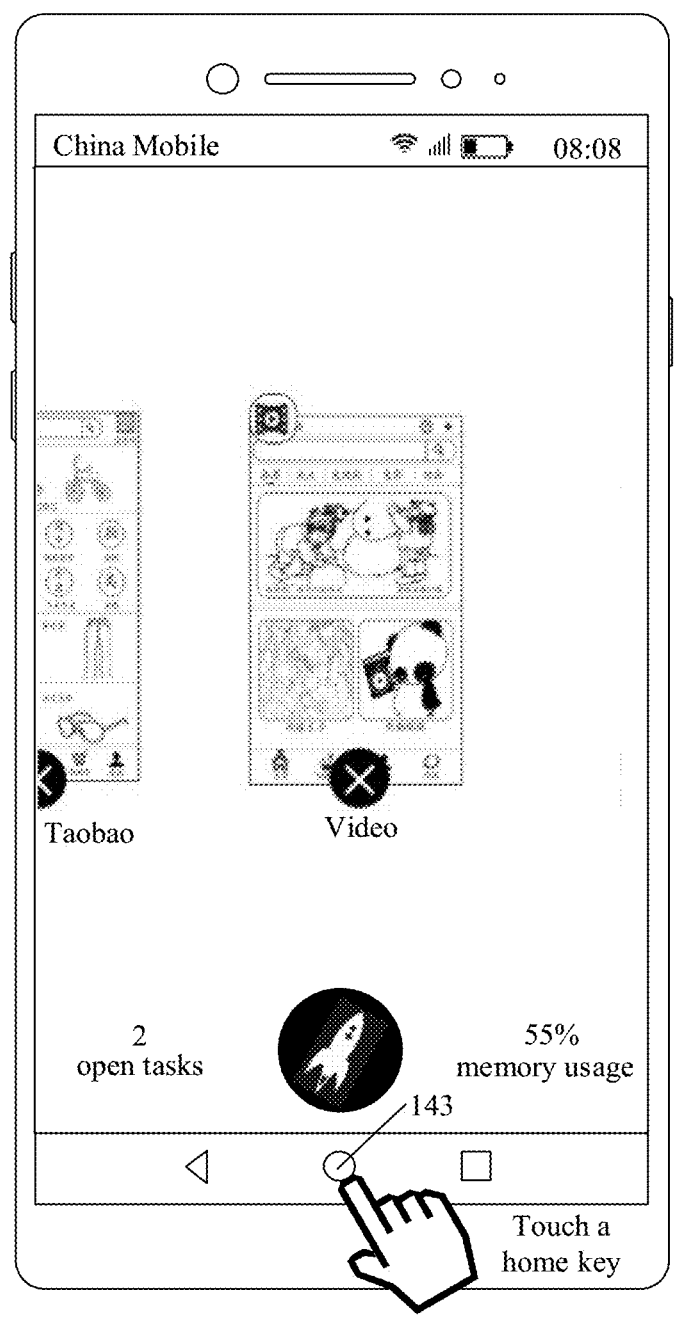
Figure 15B:
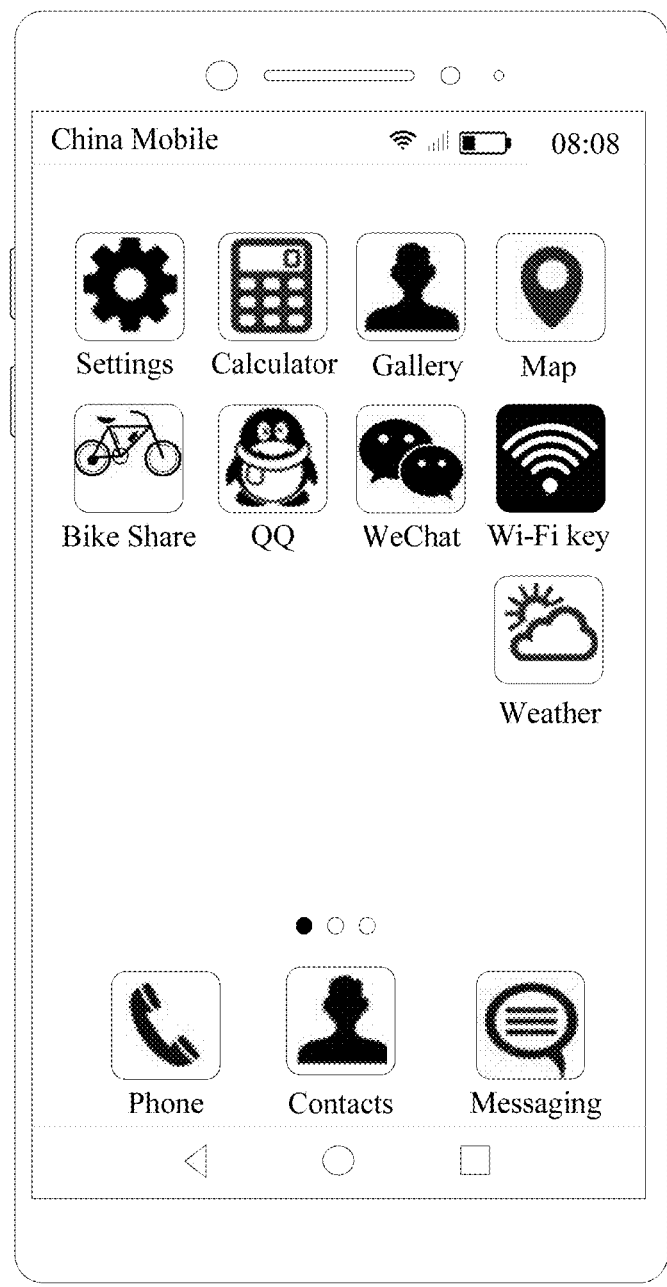
Figure 16A:
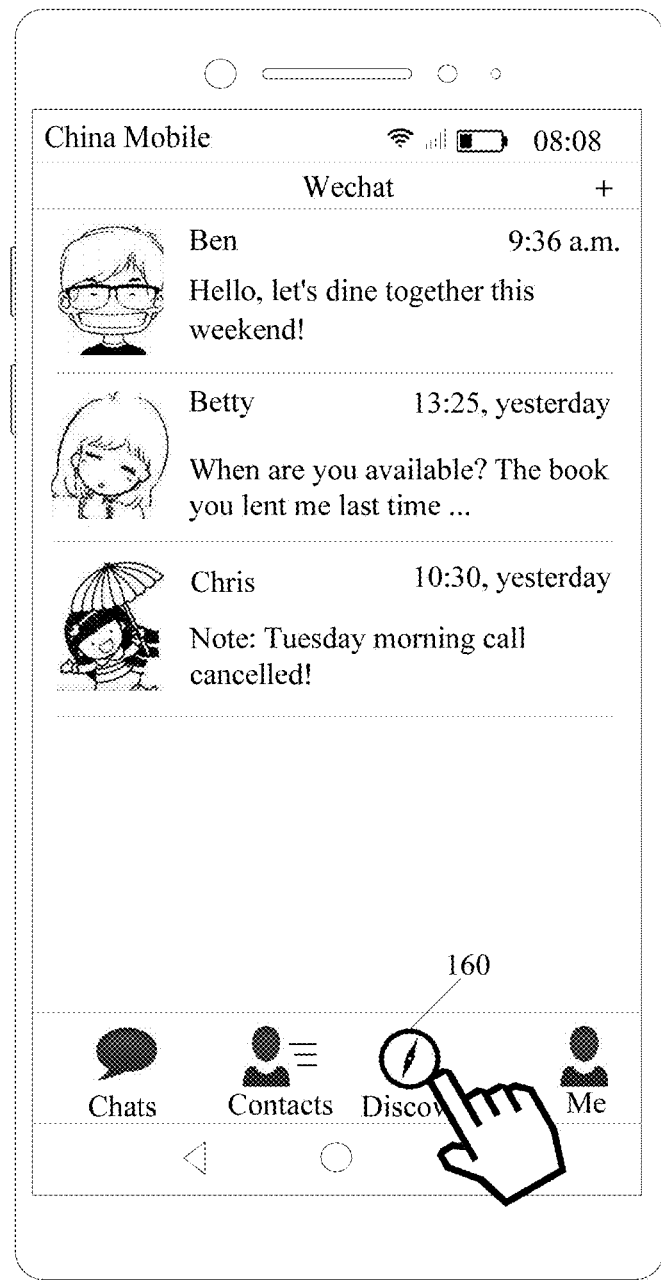
Figure 16B:
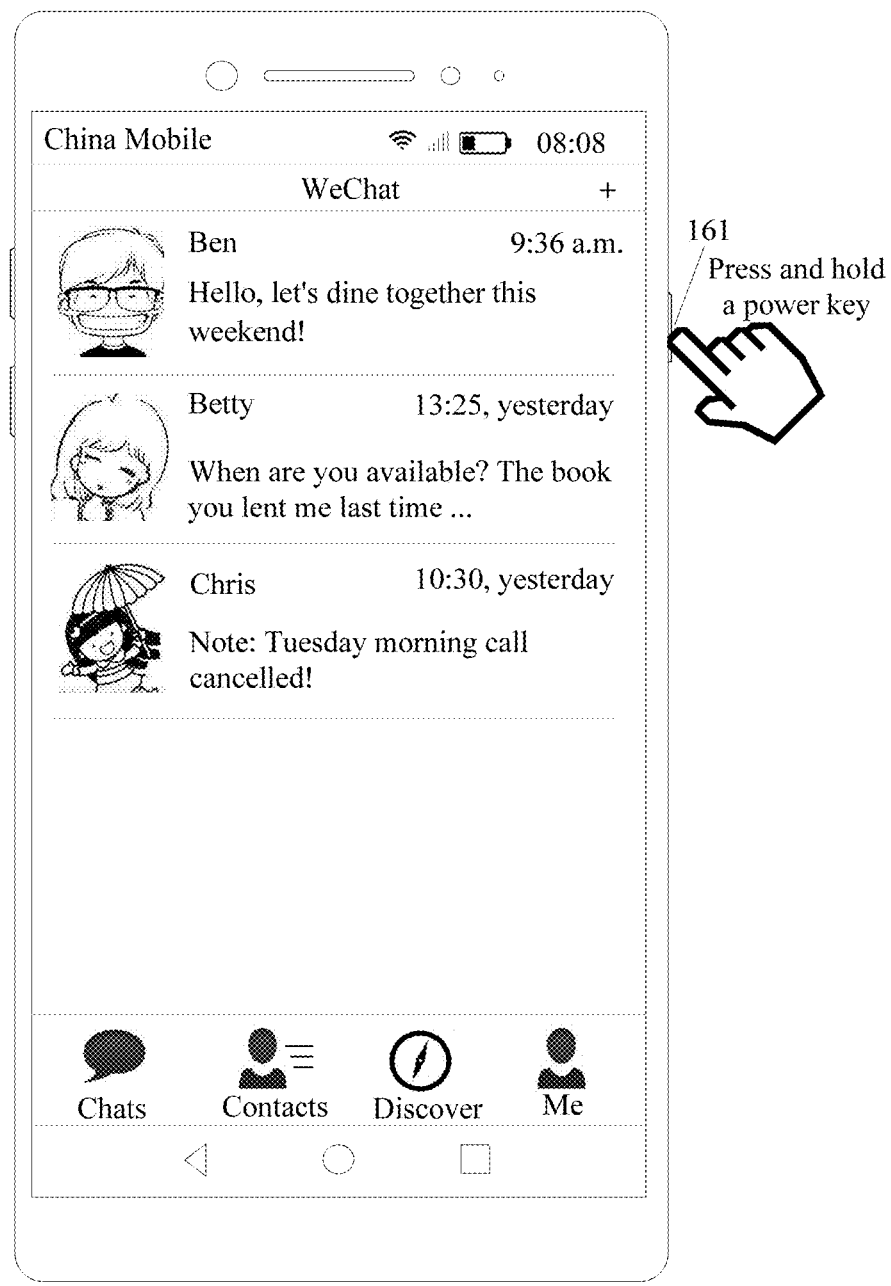
Figure 16C:
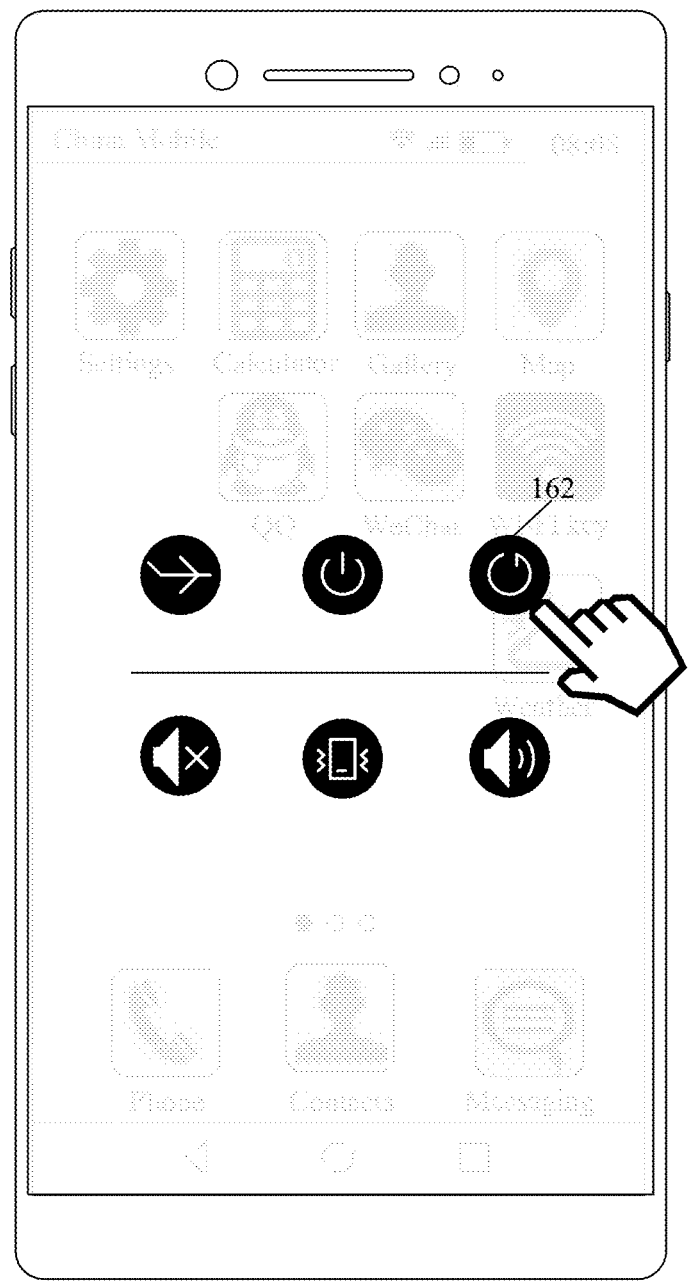
Figure 17A:
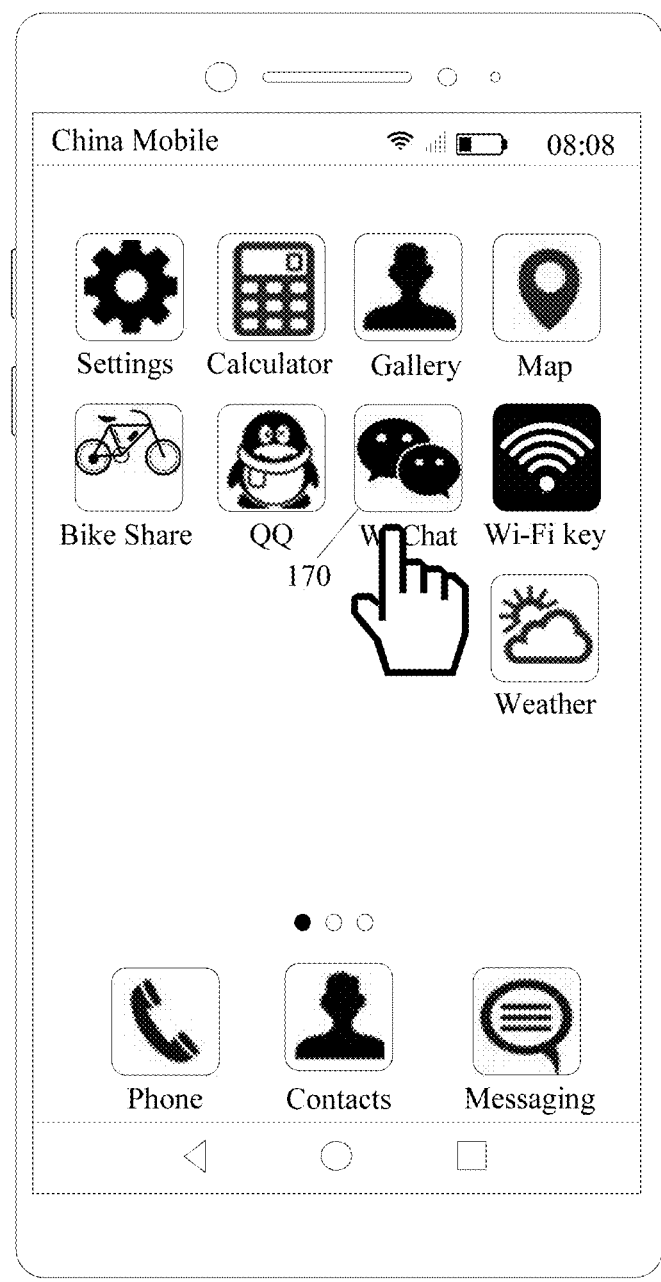
Figure 17B:
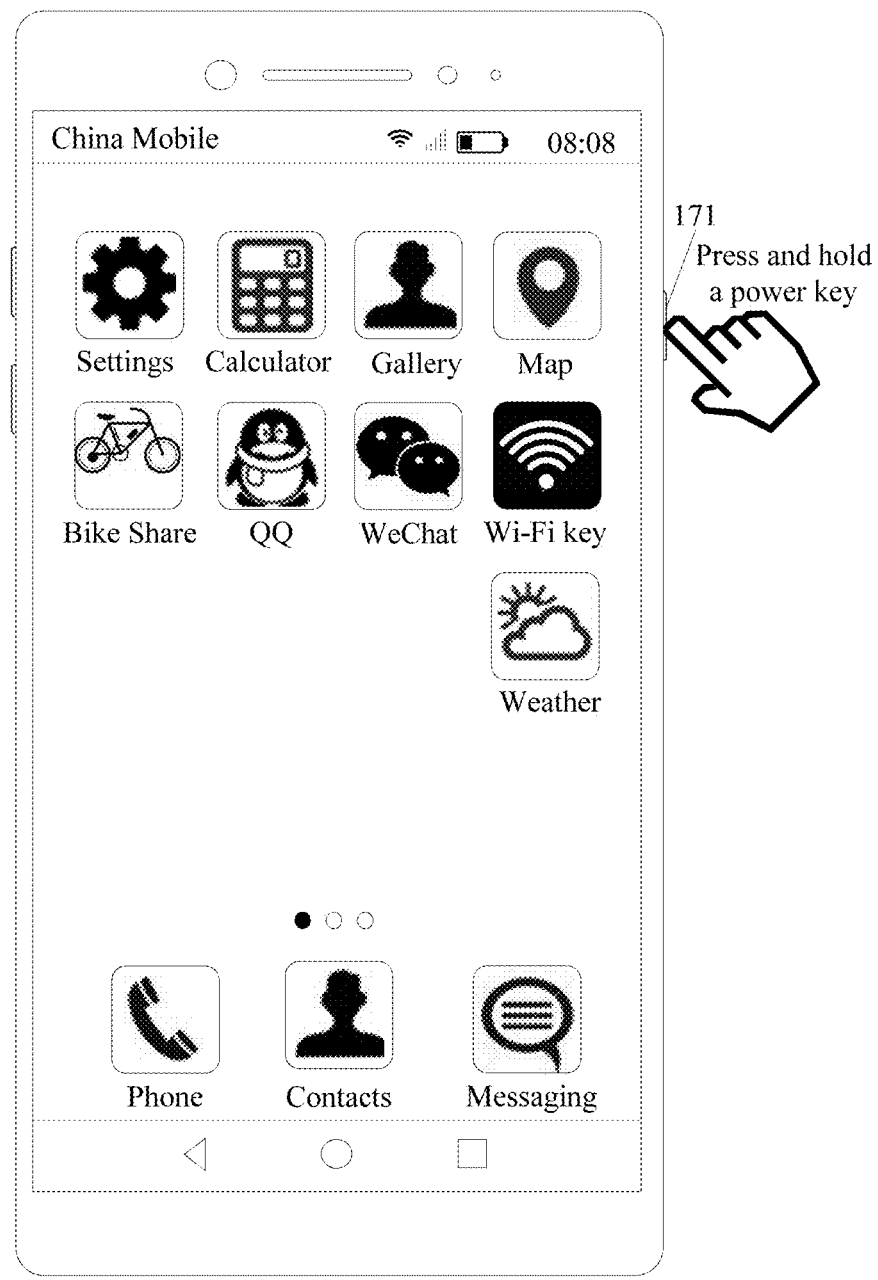
Figure 17C:
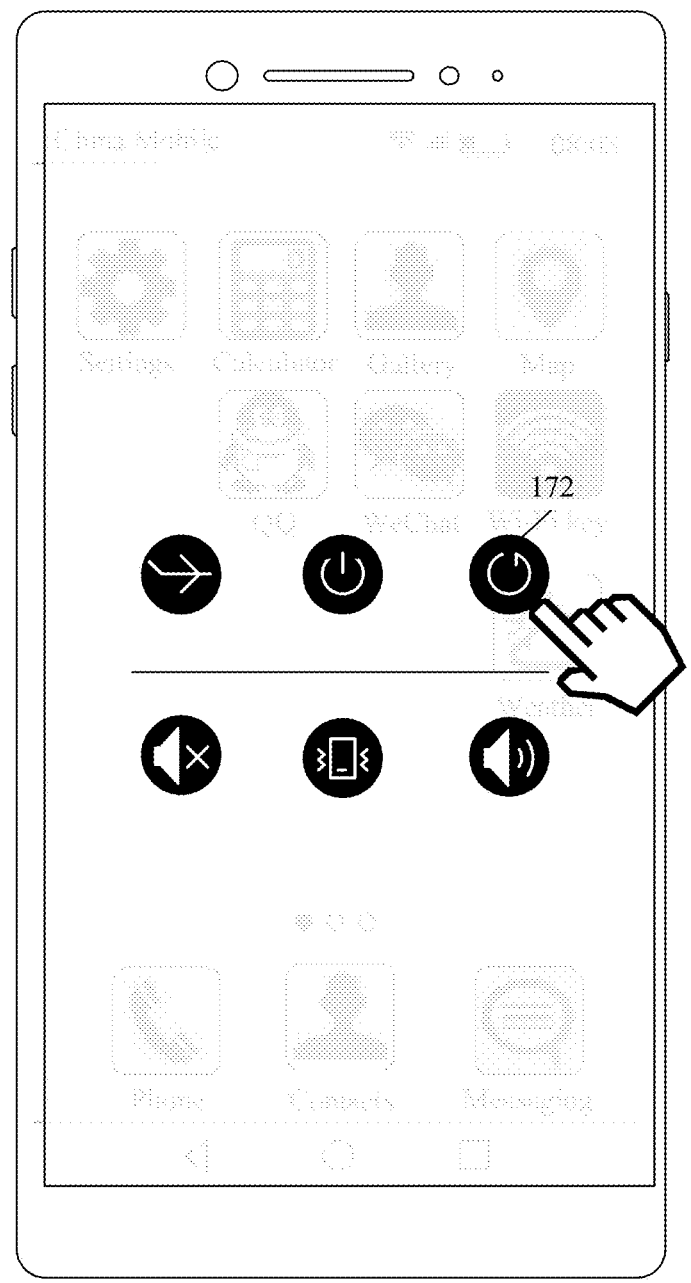
Figure 18:
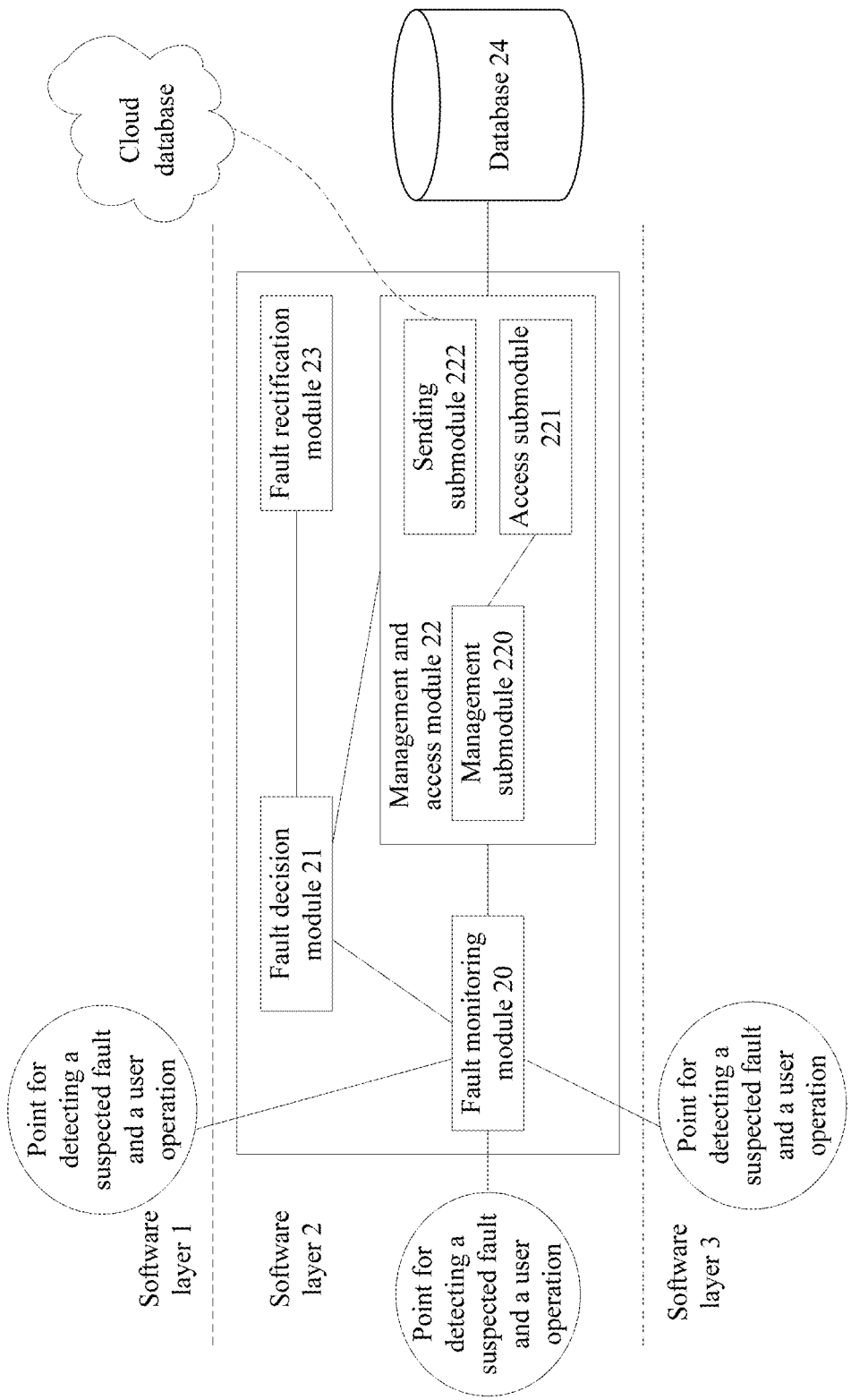
Figure 19:
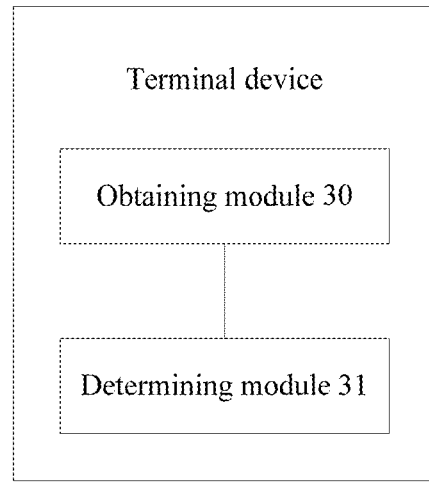
Figure 20:
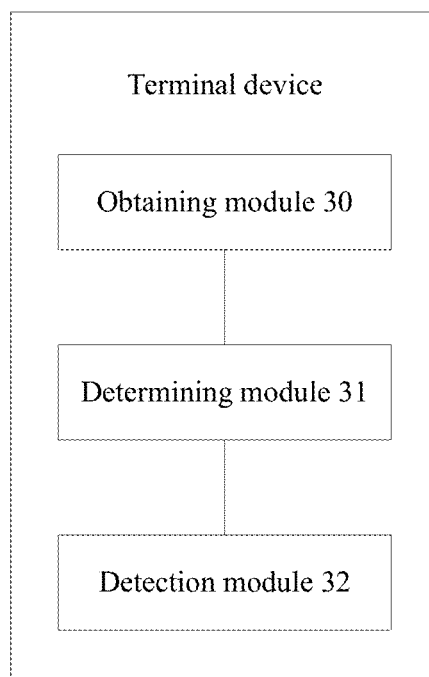
Figure 21:
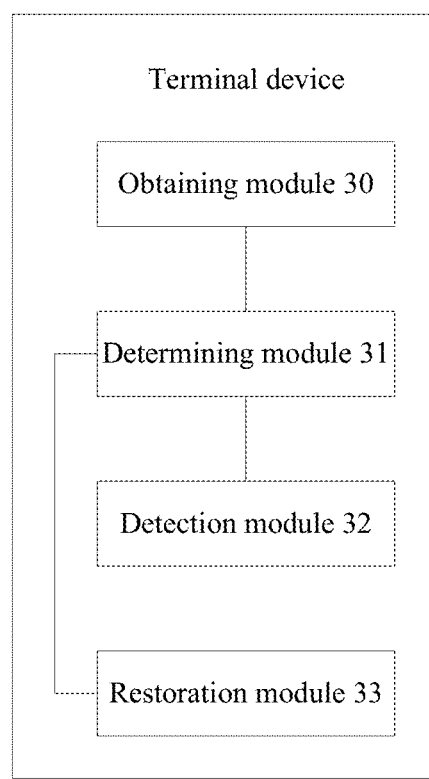
Figure 22:
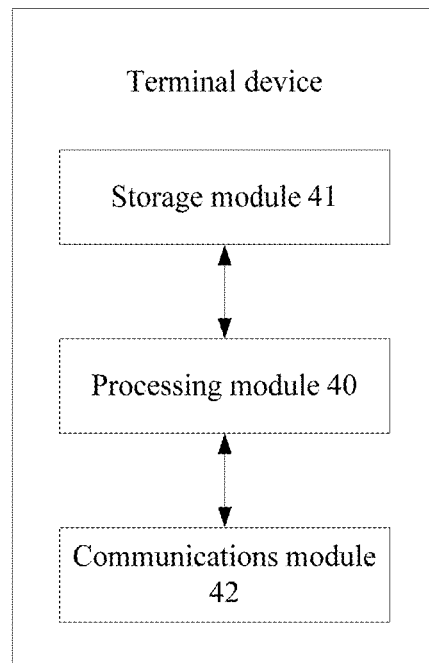
Figure 23:
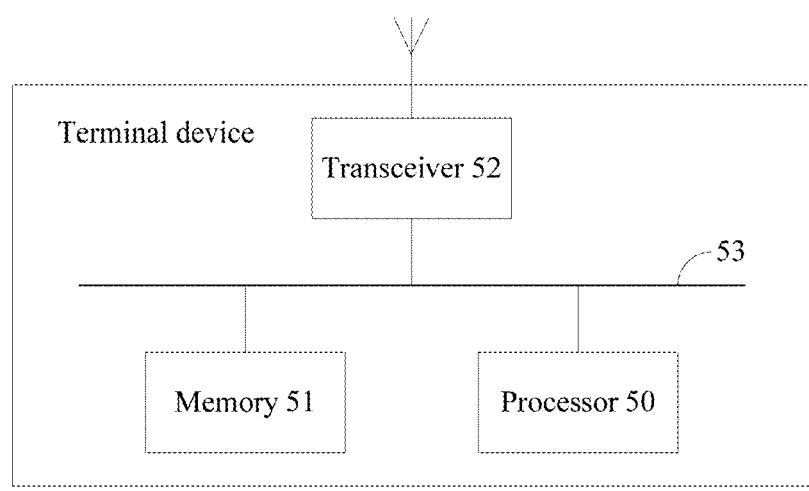

FIG. 6(a), FIG. 6(b), and FIG. 6(c) are schematic diagrams of an instance of a terminal device troubleshooting method according to an embodiment of this application;

FIG. 7(a), FIG. 7(b), and FIG. 7(c) are a schematic diagrams of another instance of a terminal device troubleshooting method according to an embodiment of this application;

FIG. 8(a) and FIG. 8(b) are schematic diagrams of another instance of a terminal device troubleshooting method according to an embodiment of this application;

FIG. 9(a), FIG. 9(b), and FIG. 9(c) are a schematic diagrams of another instance of a terminal device troubleshooting method according to an embodiment of this application;

FIG. 10(a), FIG. 10(b), and FIG. 10(c) are a schematic diagrams of another instance of a terminal device troubleshooting method according to an embodiment of this application;

FIG. 11(a) and FIG. 11(b) are schematic diagrams of another instance of a terminal device troubleshooting method according to an embodiment of this application;

FIG. 12(a) and FIG. 12(b) are schematic diagrams of another instance of a terminal device troubleshooting method according to an embodiment of this application;

FIG. 13 is a schematic diagram of another terminal device troubleshooting method according to an embodiment of this application;

FIG. 14(a), FIG. 14(b), and FIG. 14(c) are schematic diagrams of another instance of another terminal device troubleshooting method according to an embodiment of this application;

FIG. 15(a) and FIG. 15(b) are schematic diagrams of another instance of another terminal device troubleshooting method according to an embodiment of this application;

FIG. 16(a), FIG. 16(b), and FIG. 16(c) are schematic diagrams of another instance of another terminal device troubleshooting method according to an embodiment of this application;

FIG. 17(a), FIG. 17(b), and FIG. 17(c) are schematic diagrams of another instance of another terminal device troubleshooting method according to an embodiment of this application;

FIG. 18 is a framework diagram of a software hierarchy for implementing a terminal device troubleshooting method according to an embodiment of this application;

FIG. 19 is a schematic structural diagram of another terminal device according to an embodiment of this application;

FIG. 20 is a schematic structural diagram of another terminal device according to an embodiment of this application;

FIG. 21 is a schematic structural diagram of another terminal device according to an embodiment of this application;

FIG. 22 is a schematic structural diagram of another terminal device according to an embodiment of this application; and FIG. 23 is a schematic diagram of hardware of a terminal device according to an embodiment of this application.

DESCRIPTION OF EMBODIMENTS

The term "and/or" in this specification describes only an association relationship between associated objects and represents that three relationships may exist. For example, A and/or B may represent the following three cases: Only A exists, both A and B exist, and only B exists. The symbol "/" in this specification indicates an OR relationship between the associated objects. For example, A/B means A or B.

In the specification and claims of this application, the terms "first", "second", "third", and so on are intended to distinguish between different objects but do not indicate a particular order of the objects. For example, a first operation, a second operation, a third operation, and the like are used to distinguish between different operations rather than describe a specific order of operations.

In the embodiments of the present invention, the word "example" or "for example" is used to represent giving an example, an illustration, or a description. Any embodiment or design scheme described as an "example" or "for example" in the embodiments of the present invention should not be explained as being more preferred or having more advantages than another embodiment or design scheme. Exactly, use of the word "example", "for example", or the like is intended to present a related concept in a specific manner.

In descriptions of the embodiments of the present invention, unless otherwise specified, a meaning of "a plurality of" means two or more. For example, a plurality of interfaces mean two or more interfaces, a plurality of first operations mean two or more first operations, and so on.

The following first describes some terms and nouns used in this application.

A black screen refers to a phenomenon (referred to as a case 1 below) that when a display screen of a terminal device is on, and no screen-off operation is performed on the terminal device, the display screen of the terminal device is off and the terminal device fails to respond to any operation performed by a user; or refers to a phenomenon that when a display screen of a terminal device is off, and a user performs a screen-on operation on the terminal device, the display screen of the terminal device cannot be turned on all the time. For example, the case 1 is used for example. When the display screen of the terminal device displays an interface of an application program (that is, when the display screen of the terminal device is on), the user operates on the interface of the application program, in other words, the user does not perform a screen-off operation on the terminal device. In this case, if the display screen of the terminal device is off and the terminal device fails to respond to any operation performed by the user for example, the terminal device fails to respond to a display screen-on operation of the user), it can be considered that a black screen occurs on the terminal device.

Screen freezing refers to a phenomenon that a screen pauses on a display screen of a terminal device and the terminal device fails to respond to any operation performed by a user. For example, when the display screen of the terminal device displays an interface of an application program and the user operates on the interface of the application program, if the interface on which the user operates pauses on the display screen of the terminal device (that is, the terminal device fails to respond to the operation of the user), and the terminal device also fads to respond to any operation performed by the user (for example, the terminal device fails to respond to a screen-off operation of the user), it can be considered that screen freezing occurs on the terminal device.

A suspected fault is a fault that may occur on a terminal device and that is perceivable or not perceivable to a user.

An actual fault is a fault that really occurs on a terminal device and that is perceivable to a user. It is assumed that a fault that may occur on the terminal device and that is perceivable or not perceivable to the user is denoted as G1, and the fault that really occurs on the terminal device and that is perceivable to the user is denoted as G2. If G2 may be caused by G1, G1 may be referred to as a suspected fault of G2, and G2 may be referred to as an actual fault of G1.

A flash operation is an operation that is consecutively performed for a plurality of times within a specific time (for example, 10 seconds), so as to rectify a fault (for example, the actual fault in this application), for example, an operation of pressing, when screen freezing occurs on a terminal device, a key or a combination of a plurality of keys consecutively for a plurality of times within a specific time to restore the terminal to normal. A common flash operation may be an operation of touching a home key or a back key consecutively for a plurality of times (for example, three or four times) within a specific time, to return a terminal device to a home page of the terminal device.

A plurality of consecutive operations: means that there is no other operation between any two operations, and a time interval between the any two operations falls within a preset time (for example, 3 seconds).

Pressing and holding a key means pressing and holding the key for a specific time, for example, pressing and holding the key for 3 s or longer.

In the embodiments of this application, unless pressing and holding a key is specified, pressing in other scenarios means short-time pressing, that is, pressing a key for a time shorter than a specific time.

A home page of a terminal device is also referred to as a home screen (home screen) of a terminal device, and may include one or more screens. The one or more screens may be used to display an application program icon and a folder icon on the terminal device, and a folder includes icons of one or more application programs.

A forced close operation is an operation performed by a user on a terminal device to forcibly close an application program currently run on the terminal device.

A forced restart operation is an operation performed by a user on a terminal device to forcibly restart an operating system of the terminal device.

At present, in an application process of a mobile phone, content, displayed in some regions randomly selected from a display screen of the mobile phone, within a specific time is compared to find a change, so as to detect whether a fault such as a black screen or screen freezing occurs on the mobile phone. However, it is likely that the content displayed in these randomly selected regions cannot represent content displayed on the entire display screen of the mobile phone. Therefore, this may lead to inaccuracy of a result of detecting the black screen or screen freezing that occurs on the mobile phone.

To resolve this problem, the embodiments of this application provide a terminal device troubleshooting method and a terminal device. A first operation currently performed by a user on a terminal device and a result (for example, a first result) of responding by the terminal device to the first operation may be obtained; it is determined that the first operation is the same as a predefined second operation and that the first result is a fault result; and when the first operation is the same as the second operation, and the first result is a fault result, it is determined that an actual fault occurs on the terminal device. In the embodiments of this application, an operation (for example, the first operation) performed by the user on the terminal device and a result (for example, the first result) of responding by the terminal device to the operation can reflect an actual response status of the terminal device obtained when the user operates on the terminal device. Therefore, in the embodiments of this application, whether an actual fault occurs on the terminal device (in other words, whether a fault really occurs on the terminal device) is determined based on both the operation performed by the user on the terminal device and the result of responding by the terminal device to the operation. When a fault such as a black screen or screen freezing occurs on the terminal device, accuracy of a result of detecting the fault such as the black screen or screen freezing that occurs on the terminal device can be improved.

The terminal device troubleshooting method provided in the embodiments of this application may be applied to the terminal device, and the terminal device may be a terminal device having an operating system. The operating system may be the Android operating system, or may be the iOS operating system, or may be another possible operating system. This is not specifically limited in the embodiments of this application.

The terminal device in the embodiments of this application may include a mobile terminal device and a non-mobile terminal device. The mobile terminal device may be a terminal device such as a mobile phone, a tablet computer, a notebook computer, an ultra-mobile personal computer (UMPC), a netbook, a personal digital assistant (PDA), a smartwatch, or a smart band. The non-mobile terminal device may be a terminal device such as a teller machine or a self-service machine. This is not specifically limited in the embodiments of this application.

The Android operating system is used as an example below to describe a software environment to which the terminal device troubleshooting method (including a terminal device troubleshooting method and another terminal device troubleshooting method that are provided below) provided in the embodiments of this application is applied.

Figure 1:
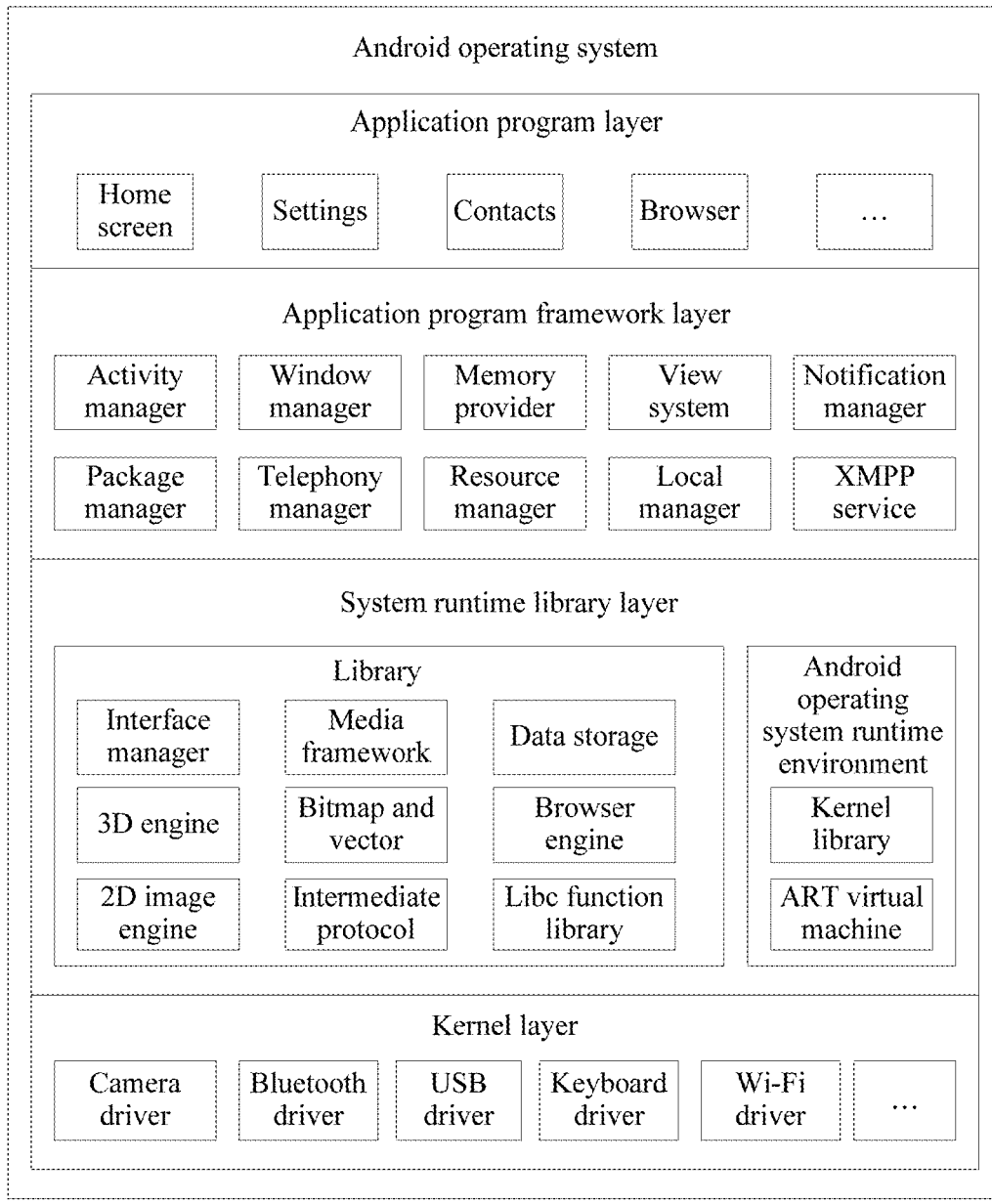
FIG. 1 is an architectural diagram of an Android operating system according to an embodiment of this application.

FIG. 1 is a schematic architectural diagram of a possible Android operating system according to an embodiment of this application. In FIG. 1, the architecture of the Android operating system includes four layers: an application program layer, an application program framework layer, a system runtime library layer, and a kernel layer (which may be specifically a Linux kernel layer).

The application program layer is a set of application programs in the Android operating system. As shown in FIG. 1, the Android operating system provides a large quantity of system application programs such as a home screen, settings, contacts, and a browser. In addition, a developer of an application program can also use the application program framework layer to develop another application program, such as a third-party application program that can be installed and run on a terminal device.

The application program framework layer is actually an application program framework. A developer can develop some application programs based on the application program framework layer in compliance with a framework development principle of the application program. As shown in FIG. 1, some important components included at the application program framework layer are: an activity manager, a window manager, a memory provider, a view system, a notification manager, a package manager, a telephony manager, a resource manager, a local management, an extensible messaging and presence protocol (XMPP) service, and the like.

The system runtime library layer includes a library (also referred to as a system library) and an Android operating system runtime environment. As shown in FIG. 1, the library mainly includes an interface manager, a media framework, a data storage, a three-dimensional (3D) engine, a bitmap and vector, a browser engine, a two-dimensional (2D) graphics engine, an intermediate protocol, and a Libc function library (a function library for a C language). The Android operating system runtime environment includes an Android runtime (ART) virtual machine and a kernel library. The ART virtual machine is used to run an application program in the Android operating system based on the kernel library. In the Android operating system, each application program has an ART virtual machine that serves the application program.

The kernel layer is an operating system layer of the Android operating system and is a lowest layer in a software hierarchy of the Android operating system. The kernel layer provides core system services based on a Linux kernel. In addition to providing these core system services, the kernel layer further provides drivers related to terminal device hardware, for example, a camera driver, a Bluetooth driver, a universal serial bus (USB) driver, a keyboard driver, and a wireless-fidelity (Wi-Fi) driver that are shown in FIG. 1.

The Android operating system is used as an example. In this embodiment of this application, based on the system architecture of the Android operating system shown in FIG. 1, a developer may develop a software program for implementing the terminal device troubleshooting method provided in the embodiments of this application, so as to execute the troubleshooting method based on the Android operating system shown in FIG. 1. Specifically, the following embodiments give descriptions in detail. Details are not described herein.

Figure 2:
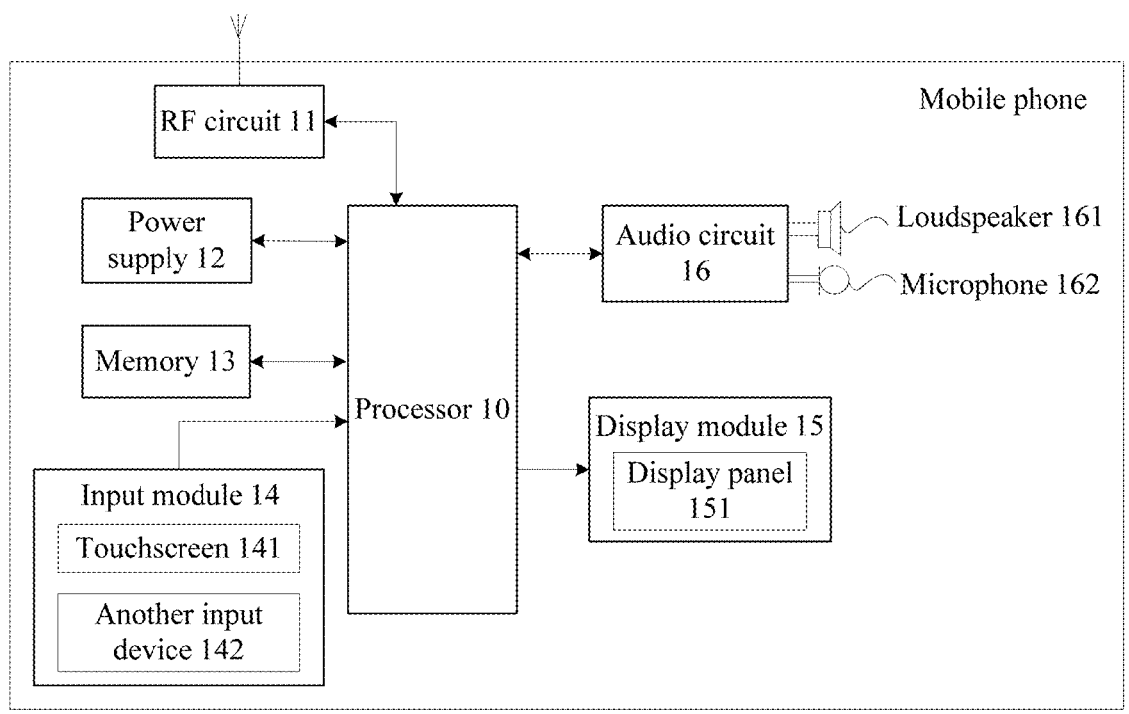
FIG. 2 is a schematic diagram of hardware of a mobile phone according to an embodiment of this application.

An example of the terminal device provided in the embodiments of this application is a mobile phone, components of the mobile phone are used with reference to FIG. 2.

For example, as shown in FIG. 2, a mobile phone provided in this embodiment of this application may include components such as a processor 10, a radio frequency (RF) circuit 11, a power supply 12, a memory 13, an input module 14, a display module 15, and an audio circuit 16. A person skilled in the art can understand that a structure of the mobile phone shown in FIG. 2 constitutes no limitation on the mobile phone. The mobile phone may include more or fewer components than those shown in FIG. 2, or a combination of some of the components shown in FIG. 2, or components deployed differently from the components shown in FIG. 2.

The processor 10 is a control center of the mobile phone, and connects various parts of the entire mobile phone by using various interfaces and lines. The processor 10 implements various functions of the mobile phone and processes data by running or executing a software program and/or module stored in the memory 13 and invoking data stored in the memory 13, to implement overall monitoring on the mobile phone. Optionally, the processor 10 may include one or more processing modules. For example, an application processor and a modem processor may be integrated into the processor 10. The application processor mainly processes a operating system, a user interface, an application program, and the like. The modem processor mainly processes wireless communication and the like. It can be understood that the modem processor may also be a processor independent of the processor 10.

The RF circuit 11 can be used to receive and transmit a signal in information transmission or reception process or a call process. For example, after receiving downlink information from a base station, the RF circuit 11 sends the downlink information to the processor 10 for processing;

and sends uplink data to the base station. Generally, the RF circuit includes but is not limited to an antenna, at least one amplifier, a transceiver, a coupler, a low noise amplifier (LNA), a duplexer, and the like. In addition, the mobile phone may further implement wireless communication with another device in a network through the RF circuit 11. Any communication standard or protocol may be used for wireless communication, including but not limited to a global system for mobile communications (GSM), a general package radio service (GPRS), code division multiple access (CDMA), wideband code division multiple access (WCDMA), long term evolution (LTE), an e-mail, a short messaging service (SMS), and the like.

The power supply 12 can be used to supply power to the various components of the mobile phone, and the power supply 12 may be a battery. Optionally, the power supply may be logically connected to the processor 10 by using a power management system, to manage functions such as charging, discharging, and power consumption management through the power management system.

The memory may be configured to store the software program and/or module, and the processor 10 performs various functional applications and data processing of the mobile phone by running the software program and/or module stored in the memory 13. The memory 13 may mainly include a storage program area and a storage data area. The storage program area may store an operating system, an application program required by at least one function (for example, a sound play function and an image play function), and the like. The storage data area may store data (for example, audio data, image data, and a phone book) created based on usage of the mobile phone, and the like. Further, the memory 13 may include a high speed random access memory, and may also include a nonvolatile memory such as at least one magnetic disk storage device, a flash memory device, or another volatile solid-state storage device.

The input module 14 may be configured to receive input number or character information, and generate a key signal input related to user settings and function control of the mobile phone. Specifically, the input module 14 may include a touchscreen 141 and another input device 142. The touchscreen 141 is also referred to as a touch panel, and can collect a touch operation performed by a user on or near the touchscreen (for example, an operation performed by the user on the touchscreen 141 or near the touchscreen 141 by using any proper object or accessory such as a finger and a stylus), and drive a corresponding connected apparatus according to a preset program. Optionally, the touchscreen 141 may include two parts: a touch detection apparatus and a touch controller. The touch detection apparatus detects a touch orientation of the user, detects a signal brought by a touch operation, and transmits the signal to the touch controller. The touch controller receives touch information from the touch detection apparatus, converts the touch information into touch point coordinates, and sends the touch point coordinates to the processor 10, and can receive a command sent by the processor 10 and execute the command. The touchscreen 141 may be implemented in a plurality of types, for example, a resistor type, a capacitor type, an infrared type, and a surface acoustic wave type. Another input device 142 may include but not limited to one or more of a physical keyboard, a function key (such as a volume control key and a power switch key), a trackball, a mouse, a joystick, and the like.

The display module 15 may be configured to display information input by the user or information provided for the user and various menus of the mobile phone. The display module 15 may include a display panel 151. Optionally, the display panel 151 may be configured in a form of a liquid crystal display (liquid crystal display, LCD), an organic light-emitting diode (organic light emitting diode, OLED), or the like. Further, the touchscreen 141 may cover the display panel 151. After detecting a touch operation on or near the touchscreen 141, the touchscreen 141 transmits the touch operation to the processor 10 to determine a type of a touch event. Subsequently, the processor 10 provides a corresponding visual output on the display panel 151 based on the type of the touch event. In FIG. 2, the touchscreen 141 and the display panel 151 serve as two independent components to respectively implement input and output functions of the mobile phone. However, in some embodiments, the touchscreen 141 may be integrated with the display panel 151 to implement the input and output functions of the mobile phone.

The audio circuit 16, a loudspeaker 161, and a microphone 162 are configured to provide an audio interface between the user and the mobile phone. The audio circuit 16 may transmit, to the loudspeaker 161, an electrical signal that is obtained through conversion of received audio data, and the loudspeaker 161 converts the electrical signal into a sound signal for output. In addition, the microphone 162 converts a collected sound signal into an electrical signal, and the audio circuit 16 receives the electrical signal and converts the electrical signal into audio data, and then outputs the audio data to the RF circuit 11 through the processor 10, so that the audio data is sent to, for example, another mobile phone, or the audio data is output to the memory 13 through the processor 10 for further processing.

Optionally, the mobile phone shown in FIG. 2 may further include various sensors, for example, a gyroscope sensor, a hygrometer sensor, an infrared sensor, and a magnetometer sensor. Details are not described herein.

Optionally, the mobile phone shown in FIG. 2 may further include a Wi-Fi module, a Bluetooth module, and the like. Details are not described herein.

The terminal device troubleshooting method provided in the embodiments of this application may be applied to the terminal device, or may be applied to a functional module or a functional entity that is of the terminal device and that is capable of implementing the troubleshooting method. This is not specifically limited in the embodiments of this application. The following describes the terminal device troubleshooting method provided in the embodiments of this application by using an example in which the terminal device troubleshooting method provided in the embodiments of this application is applied to the terminal device.

Figure 3:
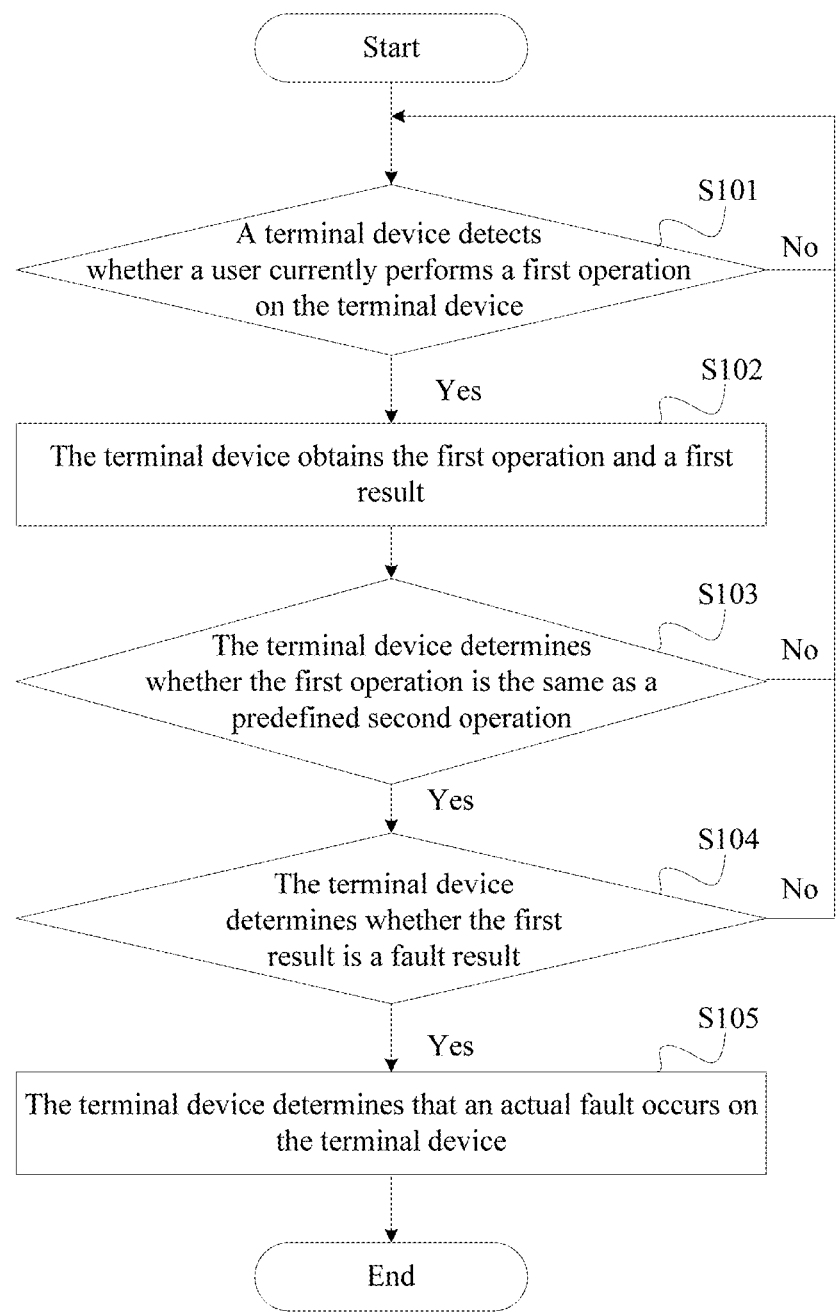
FIG. 3 is a schematic diagram of a terminal device troubleshooting method according to an embodiment of this application.

As shown in FIG. 3, an embodiment of this application provides a terminal device troubleshooting method, and the troubleshooting method may include steps S101 to S105 described below.

S101. A terminal device detects whether a user currently performs a first operation on the terminal device.

S102. When the user currently performs the first operation on the terminal device, the terminal device obtains the first operation and a first result.

The first operation is any operation currently performed by the user on, the terminal device, and the first result is a result of responding by the terminal device to the first operation performed by the user.

In this embodiment of this application, the terminal device may obtain, in real time, the any operation (namely, the first operation) currently performed by the user on the terminal device and the result (namely, the first result) of responding by the terminal device to the first operation.

It can be understood that in this embodiment of this application, the first operation in S101 and S102 is an actual operation performed by the user on the terminal device and obtained by the terminal device when the terminal device performs S101 and S102; and the first result is an actual result of responding by the terminal device to the first operation of the user when the terminal device performs S101 and S102.

In this embodiment of this application, if the terminal device does not detect that the user currently performs the first operation on the terminal device, the terminal device goes back to S101 and repeats the process.

S103. The terminal device determines whether the first operation is the same as a predefined second operation.

The second operation is any predefined operation that the user may perform on the terminal device. For example, the user touches an icon of an application program on a home screen of the terminal device, the user flicks a display screen of the terminal device on the home page of the terminal device, the user presses a power key consecutively for a plurality of times, the user touches a home key consecutively for a plurality of times, the user touches a back key consecutively for a plurality of times, and the like.

In this embodiment of this application, if the terminal device determines that the first operation is the same as the predefined second operation, the terminal device proceeds to perform S104 described below; or if the terminal device determines that the first operation is different from the predefined second operation, the terminal device goes back to S101 and repeats the process.

S104. The terminal device determines whether the first result is a fault result.

In this embodiment of this application, if the terminal device determines that the first result is a fault result, the terminal device proceeds to perform S105 described below; or if the terminal device determines that the first result is not a fault result, the terminal device goes back to S101 and repeats the process.

It should be noted that in actual implementation, an execution order of S103 and S104 may not be limited in this embodiment of this application. To be specific, in this embodiment of this application, S103 may be performed before S104; or S104 may be performed before S103, or S103 and S104 may be simultaneously performed.

Optionally, in this embodiment of this application, a method for determining, by the terminal device, whether the first result is a fault result in S104 may be specifically implemented in one of the following manners.

(1) The terminal device determines that the first result is the same as a predefined second result, and when the first result is the same as the second result, determines that the first result is a fault result. The second result is a fault result of responding by the terminal device to the second operation performed by the user on the terminal device.

In this embodiment of this application, the second result may be understood as a possible result of responding, by the terminal device when the terminal device is in an abnormal state, to the second operation performed by the user on the terminal device, that is, a result that may be displayed by the terminal device after the user performs the second operation on the terminal device when the terminal device works abnormally. For example, it is assumed that the user is using an application program 1, to be specific, a displayed screen of the terminal device is an interface of the application program 1. In this case, after the user touches the home key, when the terminal device is in the abnormal state, the displayed screen of the terminal device may still be the interface of the application program 1 (in the normal state, the displayed screen of the terminal device may return to the home screen).

(2) The terminal device determines that the first result is different from a predefined third result, and when the first result is different from the third result, determines that the first result is a fault result. The third result is a normal result of responding by the terminal device to the second operation performed by the user on the terminal device.

In this embodiment of this application, the third result may be understood as a result of responding, by the terminal device when the terminal device is in a normal state, to the second operation performed by the user on the terminal device, that is, an expected result displayed by the terminal device after the user performs the second operation on the terminal device when the terminal device works normally. For example, it is assumed that the user is using an application program 1, to be specific, a displayed screen of the terminal device is an interface of the application program 1. In this case, after the user touches the home key, when the terminal device is in a normal state, the displayed screen of the terminal device returns to the home screen.

In this embodiment of this application, that the terminal device is in a normal state means that the terminal device can operate according to a given software procedure of the terminal device, can correctly display a given screen, and can correctly respond to any operation performed on the terminal device by the user. That the terminal device is in an abnormal state means that the terminal device is in a state other than the normal state.

To better understand the first operation, the first result, the second operation, the second result, and the third result, the following provides example descriptions by using several common operations and results listed in Table 1 and Table 2 as examples. Both Table 1 and Table 2 list correspondences between operations and results. For example, Table 1 lists a correspondence between the first operation and the first result, and a correspondence between the second operation and the second result. Table 2 lists a correspondence between the first operation and the first result, and a correspondence between the second operation and the third result.

TABLE 1

| Operation number | Second operation | Second result | First operation | First result |
|---|---|---|---|---|
| 1 | The user touches an icon of an application program on the home screen of the terminal device. | The home screen displayed on the terminal device cannot be switched within a specific time (for example. 10 s). | The user touches an icon of an application program on the home screen of the terminal device. | The home screen displayed on the terminal device cannot be switched within a specific time (for example, 10 s). |
| 2 | The user flicks the display screen of the terminal device on the home page of the terminal device. | A screen displayed on the terminal device cannot be switched within a specific time. | The user flicks the display screen of the terminal device on the home page of the terminal device. | A screen displayed on the terminal device cannot be switched within a specific time. |

TABLE 1-continued

| Operation number | Second operation | Second result | First operation | First result |
|---|---|---|---|---|
| 3 | The user presses the power key consecutively for a plurality of times. | The display screen of the terminal device cannot be turned on or off within a specific time. | The user presses the power key consecutively for a plurality of times. | The display screen of the terminal device cannot be turned on or off within a specific time. |
| 4 | The user touches the home key consecutively for a plurality of times. | Failing to return to the home page of the terminal device within a specific time | The user touches the home key consecutively for a plurality of times. | Failing to return to the home page of the terminal device within a specific time |
| 5 | The user touches the back key consecutively for a plurality of times. | A screen displayed on the terminal device cannot be switched within a specific time. | The user touches the back key consecutively for a plurality of times. | A screen displayed on the terminal device cannot be switched within a specific time. |

It can be learned from Table 1 that if the predefined second operation is those listed in Table 1, but the first operation obtained by the terminal device is not one of those listed in Table 1, the terminal device may determine that the first operation is different from the predefined second operation, in other words, the terminal device may go back to S101 and repeat the process.

Referring to the correspondences between operations and results shown in Table 1, in this embodiment of this application, after the terminal device obtains the first result, if the terminal device determines that the first result is the same as the second result corresponding to the second operation (the second operation is an operation the same as the first operation), the terminal device may determine that the first result is a fault result.

TABLE 2

| Operation number | Second operation | Third result | First operation | First result |
|---|---|---|---|---|
| 1 | The user touches an icon of an application program on the home screen of the terminal device. | A screen displayed on the terminal device switches from the home screen to an interface of the application program. | The user touches an icon of an application program on the home screen of the terminal device. | The home screen displayed on the terminal device cannot be switched within a specific time (for example, 10 s). |
| 2 | The user flicks the display screen of the terminal device on the home page of the terminal device. | A screen displayed on the terminal device is switched. | The user flicks the display screen of the terminal device on the home page of the terminal device. | A screen displayed on the terminal device cannot be switched within a specific time. |

TABLE 2-continued

| Operation number | Second operation | Third result | First operation | First result |
|---|---|---|---|---|
| 3 | The user presses the power key consecutively for a plurality of times. | The display screen of the terminal device turns on or turns off. | The user presses the power key consecutively for a plurality of times. | The display screen of the terminal device cannot be turned on or off within a specific time. |
| 4 | The user touches the home key consecutively for a plurality of times. | Immediately returning to the home page of the terminal device | The user touches the home key consecutively for a plurality of times. | Failing to return to the home page of the terminal device within a specific time |
| 5 | The user touches the back key consecutively for a plurality of times. | Immediately returning to a previous screen displayed on the terminal device | The user touches the back key consecutively for a plurality of times. | A screen displayed on the terminal device cannot be switched within a specific time. |

It can be learned from Table 2 that if the predefined second operation is those listed in Table 2, but the first operation obtained by the terminal device is not one of those listed in Table 2, the terminal device may determine that the first operation is different from the predefined second operation, in other words, the terminal device may go back to S101 and repeat the process.

Referring to the correspondences between operations and results shown in Table 2, in this embodiment of this application, after the terminal device obtains the first result, if the terminal device determines that the first result is different from the third result corresponding to the second operation (the second operation is an operation the same as the first operation), the terminal device may determine that the first result is a fault result.

Optionally, the time shown in Table 1 and Table 2 may be implemented through timing of a timer of the terminal device; and a quantity of times shown in Table 1 and Table 2 may be implemented through counting of a counter of the terminal device.

In this embodiment of this application, second operations with operation numbers 3, 4, and 5 in Table 1 and Table 2 may be all referred to as flash operations. For descriptions of the flash operation, refer to the related descriptions of the flash operation in the foregoing explanation of the nouns in the embodiments. Details are not described herein again.

S105. When the first operation is the same as the second operation, and the first result is a fault result, the terminal device determines that an actual fault occurs on the terminal device.

In this embodiment of this application, if the terminal device determines that the first result is a fault result, the terminal device may determine that the actual fault occurs on the terminal device, in other words, the terminal device determines that a fault really occurs on the terminal device.

Optionally, in this embodiment of this application, the actual fault may be a black screen or screen freezing. To be specific, that the actual fault occurs on the terminal device may mean that the black screen or screen freezing really occurs on the terminal device.

In the terminal device troubleshooting method provided in this embodiment of this application, an operation (for example, the first operation) performed by the user on the terminal device and a result (for example, the first result) of responding by the terminal device to the operation can reflect an actual response status of the terminal device obtained when the user operates on the terminal device. Therefore, in this embodiment of this application, whether an actual fault occurs on the terminal device (in other words, whether a fault really occurs on the terminal device) is determined based on both the operation performed by the user on the terminal device and the result of responding by the terminal device to the operation. When a fault such as the black screen or screen freezing occurs on the terminal device, accuracy of a result of detecting the fault such as the black screen or screen freezing that occurs on the terminal device can be improved.

Figure 4:
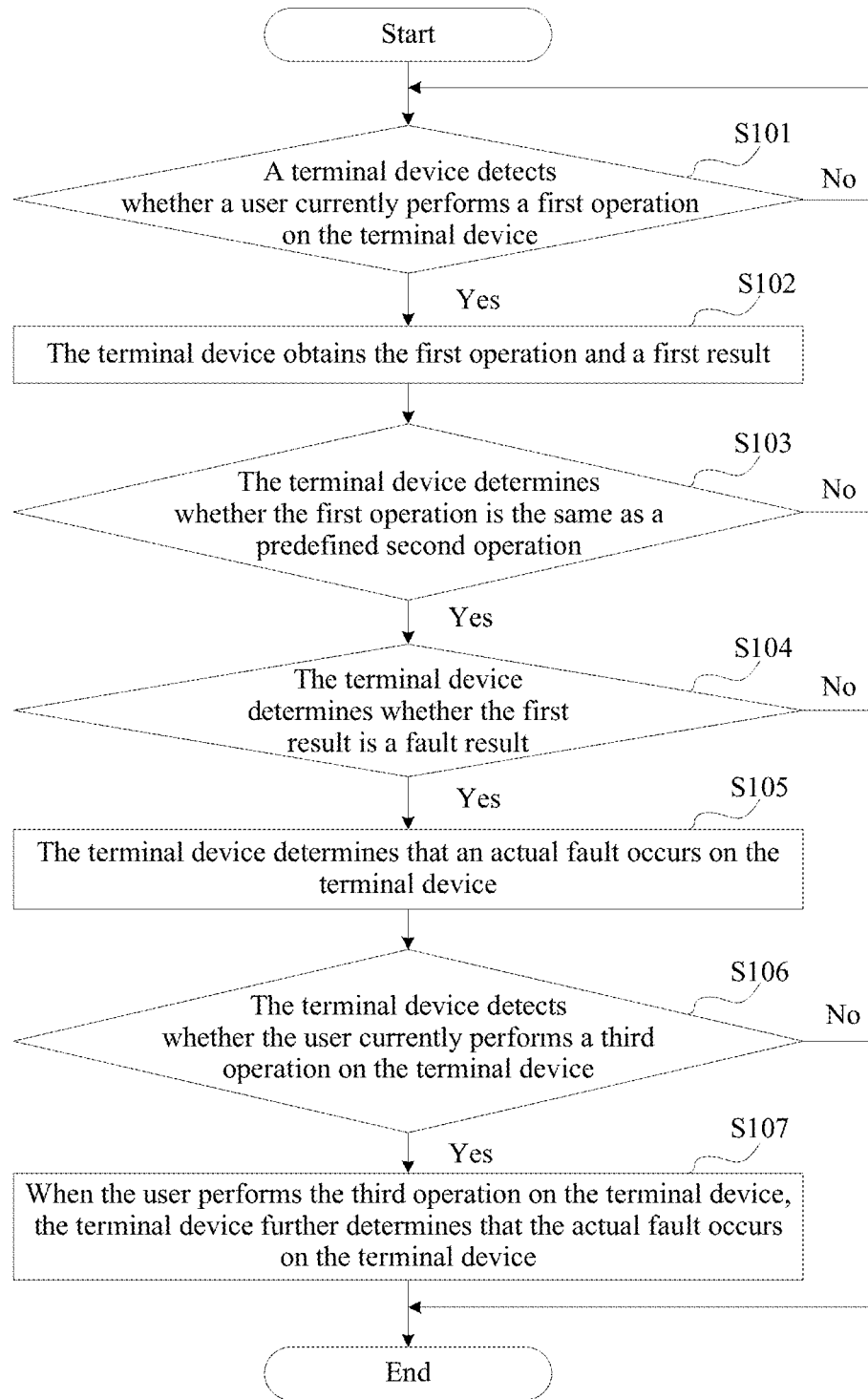
FIG. 4 is a schematic diagram of another terminal device troubleshooting method according to an embodiment of this application.

Optionally, with reference to FIG. 3, as shown in FIG. 4, after S105, the terminal device troubleshooting, method provided in this embodiment of this application may further include S106 and S107 described below.

S106. The terminal device detects whether the user currently performs a third operation on the terminal device.

In this embodiment of this application, if the terminal device detects that the user currently performs the third operation on the terminal device, the terminal device may proceed to perform S107 described below. If the terminal device does not detect that the user currently performs the third operation on the terminal device, this detection process ends.

It should be noted that "currently" in S106 is different from "currently" in the descriptions of the first operation in S101 and S102, "Currently" in S101 and S102 refers to a current moment at which the terminal device performs S101, while "currently" in S106 refers to a current moment at which the terminal device performs S106.

Optionally, in this embodiment of this application, the third operation may be an operation performed by the user on the terminal device to forcibly close an application program currently run on the terminal device (namely, a forced close operation). Alternatively, the third operation may be an operation performed by the user on the terminal device to forcibly restart an operating system of the terminal device (namely, a forced restart operation).

S107. When the user performs the third operation on the terminal device, the terminal device further determines that the actual fault occurs on the terminal device.

In this embodiment of this application, when the terminal device determines that the actual fault occurs on the terminal device in S105, if the terminal device further detects that the user performs the third operation on the terminal device, the terminal device may further determine that the actual fault occurs on the terminal device. In this way, when the fault such as the black screen or screen freezing occurs on the terminal device, the accuracy of the result of detecting the fault such as the black screen or screen freezing that occurs on the terminal device can be further improved.

For example, an example in which a black screen and screen freezing occurs on the terminal device is used. When the terminal device determines that the actual fault occurs on the terminal device in S105, if the terminal device further detects that the user performs the operation on the terminal device to forcibly close the application program currently on the terminal device, the terminal device may determine that screen freezing really occurs on the terminal device or if the terminal device further detects that the user performs the operation on the terminal device to forcibly restart the operating system of the terminal device, the terminal device may determine that the black screen or screen freezing really occurs on the terminal device.

Optionally, with reference to FIG. 3, a terminal device troubleshooting method provided in this embodiment of this application may further include S108 and S109 described below.

S108. The terminal device detects whether a suspected fault occurs on the terminal device before the first operation and the first result are obtained.

In this embodiment of this application, the terminal device may detect resource usage on the terminal device, to detect whether the suspected fault occurs on the terminal device. For example, the terminal device may detect central processing unit (CPU) and/or memory usage of the terminal device, to determine whether the suspected fault occurs on the terminal device. Generally, the CPU or memory usage of the terminal device may be relatively low (for example, lower than 80%). However, when a fault such as the black screen or screen freezing occurs on the terminal device, the terminal device may keep attempting to respond to an operation of the user, and consequently the usage of the CPU and/or memory of the terminal device may be relatively high (for example, higher than 80%). Therefore, when the terminal device detects that the CPU or memory usage of the terminal device is relatively high, the terminal device may determine that the suspected fault occurs on the terminal device.

S109. If the terminal device determines that the suspected fault occurs on the terminal device before the first operation and the first result are obtained, the terminal device determines that the actual fin& is caused by the suspected fault.

It can be understood that in this embodiment of this application, if the terminal device determines that the suspected fault occurs on the terminal device before the first operation and the first result are obtained, the terminal device may determine that the actual fault that occurs on the terminal device is caused by the suspected fault.

In other words, the terminal device determines that a reason why the actual fault occurs on the terminal device is that the suspected fault occurs on the terminal device. In this way, the terminal device can determine a specific cause of the actual fault, thereby improving, fault detection accuracy and improving fault location accuracy for a developer.

Certainly, if the terminal device determines that no suspected fault occurs on the terminal device, the terminal device may determine that the actual fault that occurs on the terminal device is not caused by the suspected fault. In other words, the terminal device determines that a reason why the actual fault occurs on the terminal device is not that the suspected fault occurs on the terminal device. For example, it may be another reason that causes the actual fault that occurs on the terminal device.

It should be noted that an execution order of S106 and S107, and S108 and S109 may not be limited in this embodiment of this application. To be specific, in this embodiment of this application, S106 and S107 may be performed before S108 and S109; or S108 and S109 may be performed before S106 and S107; or S106 and A107, and S108 and S109 may be simultaneously performed.

Optionally, in this embodiment of this application, after the terminal device determines that a hull really occurs on the terminal device, the terminal device may also perform restoration by itself. This can improve stability of the terminal device.

Figure 5:
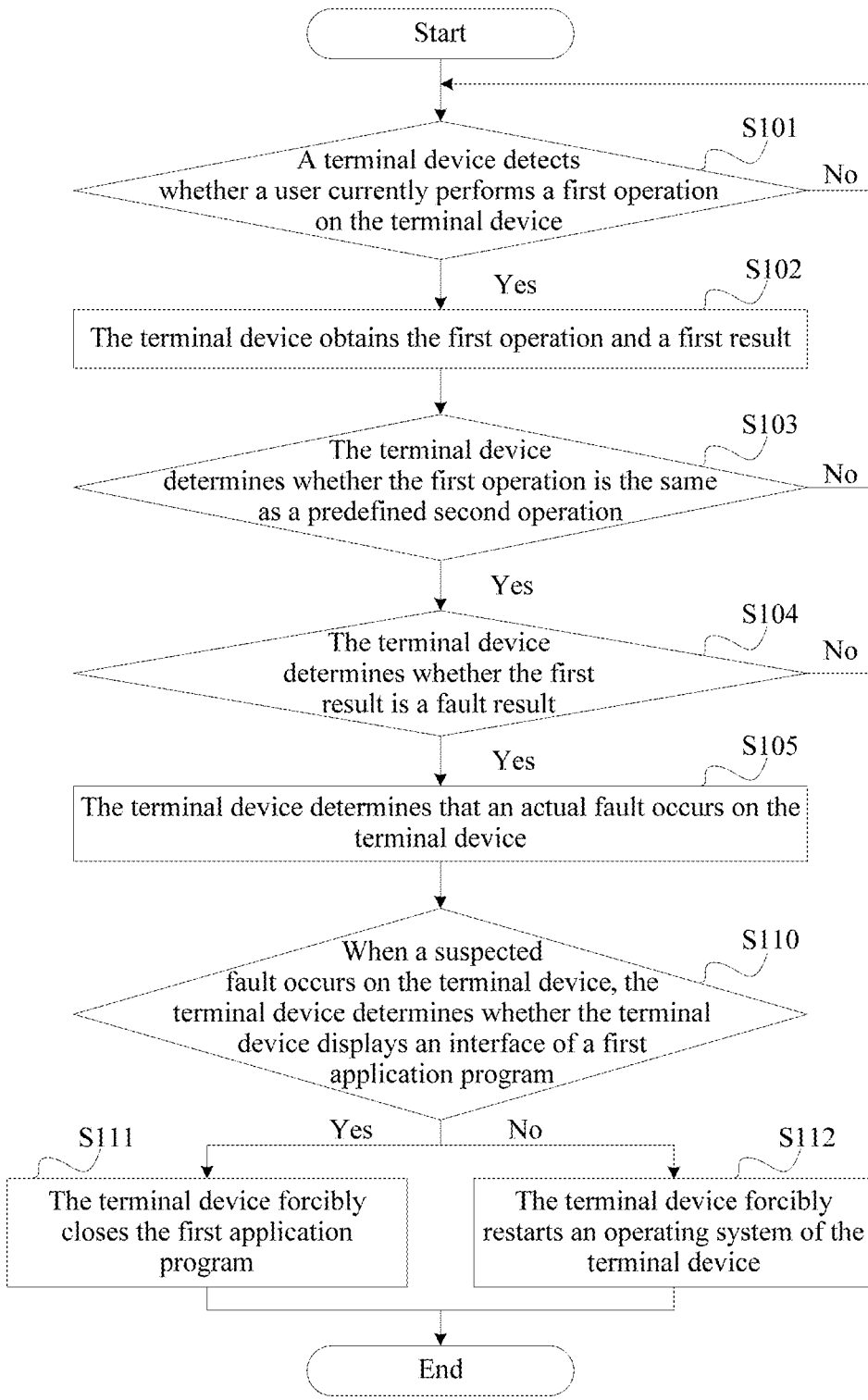
FIG. 5 is a schematic diagram of another terminal device troubleshooting method according to an embodiment of this application.

For example, with reference to FIG. 3, as shown in FIG. 5, after S105, the terminal device troubleshooting method provided in this embodiment of this application may further include S110 to S112 described below.

S110. The terminal device determines, when a suspected fault occurs on the terminal device, whether the terminal device displays an interface of a first application program.

S111. When the terminal device displays the interface of the first application program, the terminal device forcibly closes the first application program.

S112. When the terminal device does not display the interface of the first application program, the terminal device forcibly restarts the operating system of the terminal device.

Optionally, in this embodiment of this application, the first application program may be any application program on the terminal device. For example, the first application program may be a system application prop-am or a third-party application program.

The example in which the black screen or screen freezing occurs on the terminal device is still used. It can be understood that if the terminal device displays the interface of the first application program when the suspected fault occurs on the terminal device, it indicates that the black screen or screen freezing occurs on the terminal device when the user uses the first application program. In this case, the terminal device may perform restoration by itself by forcibly closing the first application program. If the terminal device does not display the interface of the first application program when the suspected fault occurs on the terminal device, it indicates that the black screen or screen freezing occurs on the terminal device when the user performs another operation (for example, the user flicks the display screen of the terminal device on the home page of the terminal device as shown in Table 1 and Table 2) instead of using the first application program. In this case, the terminal device may perform restoration by itself by forcibly restarting the operating system of the terminal device.

The terminal device self-restoration method in FIG. 5 is described based on FIG. 3. In actual implementation, the terminal device may alternatively perform the terminal device self-restoration method with reference to FIG. 4, to be specific, proceed to perform S110 to S112 after performing S107 in FIG. 4. Certainly, the terminal device may alternatively proceed to perform S110 to S112 after performing S109. For a description of proceeding to perform S110 to S112 after performing S107 by the terminal device and a description of proceeding to perform S110 to S112 after performing S109 by the terminal device, refer to the related descriptions in FIG. 5. Details are not described herein again.

Optionally, in this embodiment of this application, after the terminal device determines that a fault really occurs on the terminal device, the terminal device may further send, to a server, an event that a fault really occurs on the terminal device and a log that a fault really occurs on the terminal device, so that the server can analyze a failure rate of the terminal device based on the event and the log.

For example, with reference to FIG. 3, after S105, or with reference to FIG. 4, after S107 or S109, the terminal device troubleshooting method provided in this embodiment of this application may further include S113 described below.

S113. The terminal device sends, to the server, the event that the actual fault occurs on the terminal device and the log that the actual fault occurs on the terminal device.

The event that an actual fault occurs on the terminal device and the log that the actual fault occurs on the terminal device are used by the server to analyze the failure rate of the terminal device. After the server analyzes the failure rate of the terminal device based on the event and the log, first, the server may display the failure rate to a manufacturer, so that the manufacturer may stipulate, based on the failure rate, a quality standard for terminal device quality measurement, and find more faults and possible operations: and second, the server may also display the failure rate to the developer, so that the developer can locate a fault that occurs on the terminal device, for example, the black screen or screen freezing, and resolve this problem. In this way, product quality of the terminal device can be improved.

It should be noted that an execution order of S110 to S112, and S113 may not be limited in this embodiment of this application. To be specific, in this embodiment of this application, S110 to S112 may be performed before S113; or S113 may be performed before S110 to S112; or S110 to S112, and S113 may be simultaneously performed.

To better understand the technical solutions of this application, with reference to Table 1 (or Table 2), the following still uses an example in which the terminal device is a mobile phone, and some instances to describe in detail the terminal device troubleshooting method provided in this embodiment of this application.

The terminal device troubleshooting method provided in this embodiment of this application may be applied to any scenario from power-on (for example, a moment at which the mobile phone displays a power-on icon) to power-off of the mobile phone.

The following uses several scenarios (for example, the following scenario 1, scenario 2, scenario 3, and scenario 4) as examples to describe, with reference to Table 1 (or Table 2), the terminal device troubleshooting method provided in this embodiment of this application.

Scenario 1: Scenario in which the Mobile Phone Displays the Home Page

With reference to Table 1 (or Table 2), in the scenario in which the mobile phone displays the home page, when screen freezing occurs on the mobile phone, operations that the user may perform on the mobile phone may include first operations with operation numbers 1, 2, 3, 4, and 5 shown in Table 1 (or Table 2). To be specific, in the scenario in which the mobile phone displays the home page, when screen freezing occurs on the mobile phone, the user may perform, on the mobile phone, one or more of the first operations with the operation numbers 1, 2, 3, 4, and 5 shown in Table 1 (or Table 2) (an execution order of the plurality of first operations is not limited in this embodiment of this application).

The following example is used for description: When screen freezing occurs on the mobile phone, the user performs the first operation with the operation number 2 shown in Table 1 (or Table 2) on the mobile phone.

After the mobile phone is powered on, as shown in FIG. 6(a), the mobile phone displays the home page. It is assumed that screen freezing occurs on the mobile phone at that time (that is, resource usage of the mobile phone may have exceeded a preset threshold at that time, and the mobile phone may detect a suspected Emit), and the user operates on the home page, for example, as shown in FIG. 6(a), the user flicks a display screen (for example, from a point A to a point B) of the mobile phone on the home page of the mobile phone. The home page includes a plurality of screens, and when the user flicks the display screen of the mobile phone on one screen of the home page, the mobile phone is normally switched from one screen on the home page to another screen. However, in this case, if the user finds that the screen displayed on the mobile phone is not switched within a specific time when the user flicks the display screen of the mobile phone, the user may perceive that screen freezing occurs on the mobile phone. When the user perceives that screen freezing occurs on the mobile phone, as shown in FIG. 6(b), the user may press and hold a power key 60, so that the mobile phone displays a restart screen shown in FIG. 6(c). The user may touch a restart button 61 on the restart screen shown in FIG. 6(c) to forcibly restart an operating system of the mobile phone. For the mobile phone, according to the terminal device troubleshooting method provided in this embodiment of this application, if a first operation, obtained by the mobile phone, that the user flicks the display screen on the home page is the same as a predefined second operation with an operation number 2 in Table 1 (or Table 2), and a first result (that is, the screen displayed on the mobile phone cannot be switched within the specific time) of responding by the mobile phone to the first operation performed by the user is a fault result, the mobile phone may determine that actual screen freezing occurs on the mobile phone, in other words, screen freezing really occurs on the mobile phone. If the mobile phone determines that the first result is the same as a predefined second result corresponding to the second operation with the operation number 2 in Table 1 (or different from a predefined third result corresponding to the second operation with the operation number 2 in Table 2), the mobile phone may determine that the first result is a fault result.

Further, after determining that actual screen freezing occurs on the mobile phone, if the mobile phone further detects a forced restart operation performed by the user (for example, the user touches the restart button on the restart screen), the mobile phone may restore to normal by forcibly restarting the operating system of the mobile phone. In addition, after the mobile phone determines that actual screen freezing occurs on the mobile phone, if the mobile phone determines that a suspected fault occurs on the mobile phone before the mobile phone obtains the first operation that the user flicks the display screen on the home page and the first result of responding by the mobile phone to the first operation performed by the user, the mobile phone may determine that actual screen freezing that occurs on the mobile phone is caused by the suspected fault.

It can be understood that when, screen freezing occurs on the mobile phone, an implementation of the first operation with the operation number 1 shown in Table 1 (or Table 2) performed by the user on the mobile phone is similar to the implementation of the first operation with the operation number 2 shown in Table 1 (or Table 2) performed by the user on the mobile phone in FIG. 6(a), FIG. 6(b), and FIG. 6(e). Details are not described herein again.

Scenario 2: Scenario in which an Application Program on the Mobile Phone is Opened With reference to Table 1 (or Table 2), in the scenario in which the application program on the mobile phone is opened, when screen freezing occurs on the mobile phone, operations that the user may perform on the mobile phone may include first operations with operation numbers 3, 4, and 5 shown in Table 1 (or Table 2). To be specific, in the scenario in which the application program on the mobile phone is opened, when screen freezing occurs on the mobile phone, the user may perform, on the mobile phone, one or more of the first operations with operation numbers 3, 4, and 5 shown in Table 1 (or Table 2) (an execution order of the plurality of first operations is not limited in this embodiment of this application).

The following example is used for description: When screen freezing occurs on the mobile phone, the user performs the first operation with the operation number 4 shown in Table 1 (or Table 2) on the mobile phone.

After the mobile phone is powered on, as shown in FIG. 7(a), the mobile phone displays the home page. The user touches a WeChat icon 70 on the home page of the mobile phone to open WeChat. In a process of opening the WeChat on the mobile phone, it is assumed that screen freezing occurs on the mobile phone at that time (that is, resource usage of the mobile phone may have exceeded a preset threshold at that time, and the mobile phone may detect a suspected fault). As shown in FIG. 7(b), the mobile phone keeps displaying "opening the WeChat". In this case, if the user operates on the mobile phone, for example, as shown in FIG. 7(b), the user touches a home key 71 consecutively for a plurality of times. In a normal case, the mobile phone immediately returns to the home page of the mobile phone. However, in this case, if the user finds that the screen displayed on the mobile phone fails to return to the home page within a specific time when the user touches the home key 71 consecutively for a plurality of times, the user may perceive that screen freezing occurs on the mobile phone. When the user perceives that screen freezing occurs on the mobile phone, as shown in FIG. 7(c), the user may touch a recent key 72, so that the mobile phone displays all application programs used recently by the user, as shown in FIG. 8(a). The user may touch a close button 73 on a WeChat interface on a screen shown in FIG. 8(a) to forcibly close the WeChat. FIG. 8(b) shows a screen displayed on the mobile phone after the WeChat is forcibly closed. After the user touches the home key 71 on the screen shown in FIG. 8(b), the mobile phone returns to the home page shown in FIG. 7(a). For the mobile phone, according to the terminal device troubleshooting method provided in this embodiment of this application, if the first operation, obtained by the mobile phone, that the user touches the home key consecutively for a plurality of times is the same as a predefined second operation with an operation number 4 in Table 1 (or Table 2), and a first result (that is, the screen displayed on the mobile phone fails to return to the home page within the specific time) of responding by the mobile phone to the first operation performed by the user is a fault result, the mobile phone may determine that actual screen freezing occurs on the mobile phone, in other words, screen freezing really occurs on the mobile phone. If the mobile phone determines that the first result is the same as a predefined second result corresponding to the second operation with the operation number 4 in Table 1 (or different from a predefined third result corresponding to the second operation with the operation number 4 in Table 2), the mobile phone may determine that the first result is a fault result.

Further, after the mobile phone determines that actual screen freezing occurs on the mobile phone, if the mobile phone further detects a forced close operation performed by the user (for example, the user touches the recent key), the mobile phone may restore to normal by forcibly closing the WeChat. In addition, after the mobile phone determines that actual screen freezing occurs on the mobile phone, if the mobile, phone determines that a suspected fault occurs on the mobile phone before the mobile phone obtains the first operation that the user touches the home key consecutively for a plurality of times and the first result of responding by the mobile phone to the first operation performed by the user, the mobile phone may determine that actual screen freezing that occurs on the mobile phone is caused by the suspected fault.

It can be understood that in the scenario in which the application program on the mobile phone is opened, if the mobile phone still fails to respond after the user touches the recent key, that is, the mobile phone cannot display all the application programs used recently by the user, the user may press and hold a power key, to trigger the mobile phone to forcibly restart an operating system of the mobile phone, so as to restore the mobile phone to normal.

Scenario 3: Scenario in which the Mobile Phone Runs an Application Program

With reference to Table 1 (or Table 2), in the scenario in which the mobile phone runs the application program, when screen freezing occurs on the mobile phone, operations that the user may perform on the mobile phone may include first operations with operation numbers 3, 4, and 5 shown in Table 1 (or Table 2). To be specific, in the scenario in which the mobile phone runs the application program, when screen freezing occurs on the mobile phone, the user may perform, on the mobile phone, one or more of the first operations with operation numbers 3, 4, and 5 shown in Table 1 (or Table 2) (an execution order of the plurality of first operations is not limited in this embodiment of this application).

The following example is used for description: When screen freezing occurs on the mobile phone, the user performs the first operation with the operation number 5 shown in Table 1 (or Table 2) on the mobile phone.

After the mobile phone runs the WeChat, as shown in FIG. 9(a), the mobile phone displays the WeChat interface. The user touches on a chat window 90 of the WeChat interface shown in FIG. 9(a). As shown in FIG. 9(b), the mobile phone displays a chat history of the user with another user (for example, Betty). It is assumed that screen freezing occurs on the mobile phone at that time (that is, resource usage of the mobile phone may have exceeded a preset threshold at that time, and the mobile phone may detect a suspected fault). In this case, if the user operates on the mobile phone, for example, as shown in FIG. 9(b), the user touches a back key 91 consecutively for a plurality of times. In a normal case, the mobile phone returns to the WeChat interface shown in FIG. 9(a). However, in this case, if the user finds that the mobile phone fails to return to the WeChat interface shown in FIG. 9(a) within a specific time when the user touches the back key 91 consecutively for a plurality of times, the user may perceive that screen freezing occurs on the mobile phone. When the user perceives that screen freezing occurs on the mobile phone, as shown in FIG. 9(c), the user may touch a recent key 92, so that the mobile phone displays all application programs used recently by the user, as shown in FIG. 10(a). The user may touch a close button 93 on the WeChat interface on a screen shown in FIG. 10(a) to forcibly close the WeChat. FIG. 10(b) shows a screen displayed on the mobile phone after the WeChat is forcibly closed. After the user touches a home key 94 on the screen shown in FIG. 10(b), the mobile phone returns to a home page shown in FIG. 10(c). For the mobile phone, according to the terminal device troubleshooting method provided in this embodiment of this application, if the first operation, obtained by the mobile phone, that the user touches the back key consecutively for a plurality of times is the same as a predefined second operation with an operation number 5 in Table 1 (or Table 2), and a first result (that is, the mobile phone fails to return to the WeChat interface shown in FIG. 9(a) within the specific time) of responding by the mobile phone to the first operation performed by the user is a fault result, the mobile phone may determine that actual screen freezing occurs on the mobile phone, in other words, screen freezing really occurs on the mobile phone. If the mobile phone determines that the first result is the same as a predefined second result corresponding to the second operation with the operation number 5 in Table 1 (or different from a predefined third result corresponding to the second operation with the operation number 5 in Table 2), the mobile phone may determine that the first result is a fault result.

Further, after the mobile phone determines that actual screen freezing occurs on the mobile phone, if the mobile phone further detects a forced close operation performed by the user (for example, the user touches the recent key), the mobile phone may restore to normal by forcibly closing the WeChat. In addition, after the mobile phone determines that actual screen freezing occurs on the mobile phone, if the mobile phone determines that a suspected fault occurs on the mobile phone before the mobile phone obtains the first operation that the user touches the back key consecutively for a plurality of times and the first result of responding by the mobile phone to the first operation performed by the user, the mobile phone may determine that actual screen freezing that occurs on the mobile phone is caused by the suspected fault.

It can be understood that in the scenario in which the mobile phone runs the application program, if the mobile phone still fails to respond after the user touches the recent key, that is, the mobile phone cannot display all the application programs used recently by the user, the user may press and hold a power key, to trigger the mobile phone to forcibly restart an operating system of the mobile phone, so as to restore the mobile phone to normal.

Scenario 4: Scenario in Which a Folder on the Home Page of the Mobile Phone is Opened.

With reference to Table 1 (or Table 2), in the scenario in which the folder (icons of one or more application programs are included in the folder) on the home page of the mobile phone is opened, when screen freezing occurs on the mobile phone, operations that the user may perform on the mobile phone may include first operations with operation numbers 1, 3, 4, and 5 shown in Table 1 (or Table 2). To be specific, in the scenario in which the folder on the home page of the mobile phone is opened, when screen freezing occurs on the mobile phone, the user may perform, on the mobile phone, one or more of the first operations with the operation numbers 1, 3, 4, and 5 shown in Table 1 (or Table 2) (an execution order of the plurality of first operations is not limited in this embodiment of this application).

The following example is used for description: When screen freezing occurs on the mobile phone, the user performs the first operation with the operation number 3 shown in Table 1 (or Table 2) on the mobile phone.

After the mobile phone is powered on, the mobile phone displays the home page (which is specifically a home, screen herein), and the user flicks the home page of the mobile phone to switch a screen displayed on the mobile phone from the home page to another screen, for example, a screen shown in FIG. 11(a). As shown in FIG. 11(a), the user touches a finance folder 110 on the screen of the mobile phone. As shown in FIG. 11(b), the mobile phone displays a screen on which the finance folder is opened. It is assumed that screen freezing occurs on the mobile phone at that time (that is, resource usage of the mobile phone may have exceeded a preset threshold at that time, and the mobile phone may detect a suspected fault). In this case, if the user operates on the mobile phone, for example, as shown in FIG. 11(b), the user presses a power key 111 consecutively for a plurality of times, a display screen of the mobile phone is turned on or off in a normal case. However, in this case, if the user finds that the display screen of the mobile phone cannot be turned on or off within a specific time when the user presses the power key 111 consecutively for a plurality of times, the user may perceive that screen freezing occurs on the mobile phone. When the user perceives that screen freezing occurs on the mobile phone, as shown in FIG. 12(a), the user may press and hold the power key 111, so that the mobile phone displays a restart screen shown in FIG. 12(b). The user may touch a restart button 112 on the restart screen shown in FIG. 12(b) to forcibly restart an operating system of the mobile phone. For the mobile phone, according to the terminal device troubleshooting method provided in this embodiment of this application, if the first operation, obtained by the mobile phone, that the user presses the power key consecutively for a plurality of times is the same as a predefined second operation with an operation number 3 in Table 1 (or Table 2), and a first result (that is, the display screen of the mobile phone cannot be turned on or off within the specific time) of responding by the mobile phone to the first operation performed by the user is a fault result, the mobile phone may determine that actual screen freezing occurs on the mobile phone, in other words, screen freezing really occurs on the mobile phone. If the mobile phone determines that the first result is the same as a predefined second result corresponding to the second operation with the operation number 3 in Table 1 (or different from a predefined third result corresponding to the second operation with the operation number 3 in Table 2), the mobile phone may determine that the first result is a fault result.

Further, after determining that actual screen freezing occurs on the mobile phone, if the mobile phone further detects a forced restart operation performed by the user (for example, the user touches the restart button on the restart screen), the mobile phone may restore to normal by forcibly restarting the operating system of the mobile phone. In addition, after the mobile phone determines that actual screen freezing occurs on the mobile phone, if the mobile phone determines that a suspected fault occurs on the mobile phone before the mobile phone obtains the first operation that the user presses the power key consecutively for a plurality of times and the first result of responding by the mobile phone to the first operation performed by the user, the mobile phone may determine that actual screen freezing that occurs on the mobile phone is caused by the suspected fault.

It should be noted that FIG. 6(a), FIG. 6(b), and FIG. 6(c), FIG. 7(a), FIG. 7(b), and FIG. 7(c), FIG. 8(a) and FIG. 8(b), FIG. 9(a), FIG. 9(b), and FIG. 9(c), FIG. 10(a), FIG. 10(b), and FIG. 10(c), FIG. 11(a) and FIG. 11(b), and FIG. 12(a) and FIG. 12(b) are all described by using an example in which screen freezing occurs on the mobile phone. In actual application, when a black screen occurs on the mobile phone, the user may also perform the foregoing one or more first operations on the mobile phone. In this case, the user cannot see a screen displayed on the mobile phone. Therefore, when the black screen occurs on the mobile phone, the user may forcibly restart the operating system of the mobile phone by directly pressing and holding the power key for a preset time (which may be usually 10 s or longer).

It can be understood that the four scenarios listed above are examples used to describe the terminal device troubleshooting method provided in this embodiment of this application. In actual application, more possible scenarios may be further included, and are not described one by one in this embodiment.

As shown in FIG. 13, an embodiment of this application further provides another terminal device troubleshooting method, and the troubleshooting method may include S201 to S207 described below.

S201. A terminal device detects whether a user currently performs an operation on the terminal device.

S202. When the user currently performs an operation on the terminal device, the terminal device obtains the operation currently performed by the user on the terminal device.

In this embodiment of this application, the terminal device may obtain the operation currently performed by the user on the terminal device in real time.

It can be understood that in this embodiment of this application, the operation in S201 and S202 is an actual operation performed by the user on the terminal device and obtained by the terminal device when the terminal device performs S201 and S202.

Optionally, in this embodiment of this application, the operation currently performed by the user on the terminal device may be an operation performed by the user on the terminal device to forcibly close an application program currently run on the terminal device (namely, a forced close operation). Alternatively, the operation may be an operation performed by the user on the terminal device to forcibly restart an operating system of the terminal device (namely, a forced restart operation).

In this embodiment of this application, the operation currently performed by the user on the terminal device in S201 and S202 may restore the terminal device to normal.

For example, if a fault occurs on the terminal device when the terminal device is running an application program, the terminal device can restore to normal after the user performs the operation on the terminal device. Specifically, the user may perform a forced close operation on the terminal device, so that the terminal device restores to normal by forcibly closing the application program currently rim on the terminal device; or the user may perform a forced restart operation on the terminal device, so that the terminal device restores to normal by forcibly restarting the operating system of the terminal device.

For another example, if a fault does not occur on the terminal device when the terminal device is running an application program (for example, a fault occurs in a power-on process or a return-to-home page process), the terminal device can restore to normal after the user performs the operation on the terminal device. Specifically, the user may perform a forced restart operation on the terminal device, so that the terminal device restores to normal by forcibly restarting the operating system of the terminal device.

For other descriptions of the operation currently performed by the user on the terminal device, refer to the related descriptions of the third operation in the foregoing embodiment shown in FIG. 4. Details are not described herein again.

In this embodiment of this application, if the terminal device does not detect that the user currently performs an operation on the terminal device, the terminal device goes back to S201 and repeats the process.

S203. The terminal device determines Whether the operation is the same as a predefined reference operation.

Tn this embodiment of this application, the reference operation is a predefined operation that is to be performed by the user on the terminal device to restore the terminal device to normal. For example, the reference operation may be a predefined operation that is to be performed by the user on the terminal device to forcibly close the application program currently run on the terminal device. Alternatively, the reference operation may be a predefined operation that is to be performed by the user on the terminal device to forcibly restart the operating, system of the terminal device.

Certainly, the reference operation in this embodiment of this application may alternatively be another operation that restores the terminal device to normal. This is not limited in this embodiment of this application.

S204. The terminal device determines that the operation is the same as the predefined reference operation.

In this embodiment of this application, if the terminal device determines that the operation performed by the user on the terminal device is the same as the predefined reference operation, the terminal device proceeds to perform S205 described below; or if the terminal device determines that the operation is different from the reference operation, the terminal device goes back to S201 and repeats the process.

S205. The terminal device detects whether a suspected fault occurs on the terminal device before the operation is obtained.

For descriptions of S205, refer to the related descriptions of S108 in the foregoing embodiment. Details are not described herein again.

S206. The terminal device determines that a suspected fault occurs on the terminal device before the operation is obtained.

In this embodiment of this application, if the terminal device determines that the suspected fault occurs on the terminal device before the operation is obtained, the terminal device proceeds to perform S207 described below; or if the terminal device determines that the suspected fault does not occur on the terminal device before the operation is obtained, the terminal device goes back to S201 and repeats the process.

It should be noted that an execution order of S204, and S205 and S206 may not be limited in this embodiment of this application. To be specific, in this embodiment of this application, S204 may be performed before S205 and S206; or S205 and S206 may be performed before S204; or S204, and S205 and S206 may be simultaneously performed.

S207. When the operation is the same as the reference operation, and the suspected fault occurs on the terminal device before the operation is obtained, the terminal device determines that an actual fault occurs on the terminal device.

In this embodiment of this application, when a fault occurs, the user performs either the forced close operation on the terminal device or the forced restart operation on the terminal device, to restore the terminal device to normal. Therefore, in this embodiment, when the terminal device determines that the operation currently performed by the user on the terminal device is a forced close operation or a forced restart operation, and that a suspected fault occurs on the terminal device before the terminal device obtains the operation of the user, the terminal device may determine that the actual fault occurs on the terminal device (that is, a fault really occurs on the terminal device).

It can be understood that in this embodiment of this application, after the terminal device obtains the operation currently performed by the user on the terminal device, if the terminal device determines that the operation is the same as the predefined reference operation, and the terminal device determines that the suspected fault occurs on the terminal device before the operation is obtained, the terminal device may determine that the actual fault occurs on the terminal device, that is, the terminal device determines that the fault really occurs on the terminal device.

Optionally, in this embodiment of this, application, the actual fault may be a black screen or screen freezing. To be specific, that the actual fault occurs on the terminal device may mean that the black screen or screen freezing occurs on the terminal device. For descriptions of the actual fault, refer to the related descriptions of the actual fault in the embodiment shown in FIG. 3. Details are not described herein again.

According to the another terminal device troubleshooting method provided in this embodiment of this application, the operation currently performed by the user on the terminal device can restore the terminal device to normal, and therefore the user possibly performs the operation on the terminal device only when a fault really occurs on the terminal device. In this way, if the operation that is currently performed by the user on the terminal device and that is obtained by the terminal device is the same as the predefined reference operation, and the terminal device determines that the suspected fault occurs on the terminal device before the user performs the operation on the terminal device, the terminal device may determine that the actual fault occurs on the terminal device (in other words, the fault really occurs on the terminal device). Therefore, when a fault such as the black screen or screen freezing occurs on the terminal device, accuracy of a result of detecting the fault such as the black screen or screen freezing that occurs on the terminal device can be improved.

Optionally, in this embodiment of this application, after the terminal device determines that the fault really occurs on the terminal device, the terminal device may further send, to a server, an event that a fault really occurs on the terminal device and a log that a fault really occurs on the terminal device, so that the server can analyze a failure rate of the terminal device based on the event and the log.

For example, with reference to FIG. 13, after S207, the another terminal device troubleshooting method provided in this embodiment of this application may further include S208 described below.

S208. The terminal device sends, to the server, the event that the actual fault occurs on the terminal device and the log that the actual fault occurs on the terminal device.

For descriptions of S208, refer to the related descriptions of S113 in the foregoing embodiment. Details are not described herein again.

To better understand the technical solution of this application, the following still uses an example in which the terminal device is a mobile phone, and some instances to describe in detail the another terminal device troubleshooting method provided in this embodiment of this application.

The another terminal device troubleshooting method provided in this embodiment of this application may be applied to any scenario from power-on (for example, a moment at which the mobile phone displays a power-on icon) to power-off of the mobile phone.

The operation performed by the user on the mobile phone in this embodiment may be a forced close operation or a forced restart operation. The forced close operation is usually performed when the mobile phone runs an application program, and the forced restart operation is usually performed in any scenario from power-on to power-off of the mobile phone, for example, the scenarios 1 to 4 in the foregoing embodiment. Therefore, the following separately describes the another terminal device troubleshooting method provided in this embodiment of this application by using the following scenarios as examples: the scenario in which the mobile phone runs an application program (for example, the scenario 3 in the foregoing embodiment) and the scenario in which the mobile phone displays a home page (for example, the scenario 1 in the foregoing embodiment).

1. Scenario in which the Mobile Phone Runs an Application Program

In the scenario in which the mobile phone runs the application program the user may perform either a forced close operation or a forced restart operation on the mobile phone.

It is assumed that the user performs a forced close operation on the mobile phone, and an example in which the application program run on the mobile phone is WeChat is used. As shown in FIG. 14(a), the mobile phone displays a WeChat interface. If the user finds that the mobile phone does not respond (that is, resource usage of the mobile phone may have exceeded a preset threshold at that time, and the mobile phone may detect a suspected fault) when the user operates any content on the WeChat interface, for example, as shown in FIG. 14(a), a screen displayed on the mobile phone cannot be switched within a specific time when the user touches a chat record 140, the user may perceive that screen freezing occurs on the mobile phone. When the user perceives that screen freezing occurs on the mobile phone, as shown in FIG. 14(b), the user may touch a recent key 141, so that the mobile phone displays all application programs used recently by the user, as shown in FIG. 14(c). The user may touch a close button 142 on the WeChat interface on a screen shown in FIG. 14(c) to forcibly close the WeChat. FIG. 15(a) shows a screen displayed after the mobile phone forcibly closes the WeChat. After the user touches a home key 143 on the screen shown in FIG. 15(a), the mobile phone returns to a home page shown in FIG. 15(b). For the mobile phone, according to the another terminal device troubleshooting method provided in this embodiment of this application, if the forced close operation (this operation may restore the mobile phone to normal, for example, the user touches the close button on the WeChat interface on the screen shown in FIG. 14(c) to forcibly close the WeChat, so as to restore the mobile phone to normal) that is performed by the user and obtained by the mobile phone is the same as a predefined forced close operation, and the mobile phone determines that the suspected fault occurs on the mobile phone before the mobile phone obtains the forced close operation performed by the user, the mobile phone may determine that actual screen freezing occurs on the mobile phone, that is, screen freezing really occurs on the mobile phone.

It is assumed that the user performs a forced restart operation on the mobile phone, and the example in which the application program run on the mobile phone is the WeChat is still used. As shown in FIG. 16(a), the mobile phone displays a WeChat interface. If the user finds that the mobile phone does not respond (that is, resource usage of the mobile phone may have exceeded a preset threshold at that time, and the mobile phone may detect a suspected fault) when the user operates any content on the WeChat interface, for example, as shown in FIG. 16(a), a screen displayed on the mobile phone cannot be switched within a specific time when the user touches a discover button 160, the user may perceive that screen freezing occurs on the mobile phone. When the user perceives that screen freezing occurs on the mobile phone, as shown in FIG. 16(b), the user may press and hold a power key 161, so that the mobile phone displays a restart screen shown in FIG. 16(c). The user may touch a restart button 162 on the restart screen shown in FIG. 16(c) to forcibly restart the operating system of the mobile phone. For the mobile phone, according to the another terminal device troubleshooting method provided in this embodiment of this application, if the forced restart operation (this operation may restore the mobile phone to normal, for example, the user touches the restart button on the restart screen to forcibly restart the operating system of the mobile phone, so as to restore the mobile phone to normal) that is performed by the user and obtained by the mobile phone is the same as a predefined forced restart operation, and the mobile phone determines that the suspected fault occurs on the mobile phone before the mobile phone obtains the forced restart operation performed by the user, the mobile phone may determine that actual screen freezing occurs on the mobile phone, that is, screen freezing really occurs on the mobile phone.

2. Scenario in which the Mobile Phone Displays a Home Page

In the scenario in which the mobile phone displays the home page, as shown in FIG. 17(a), the mobile phone displays the home page. If the user finds that the mobile phone does not respond (that is, resource usage of the mobile phone may have exceeded a preset threshold at that time, and the mobile phone may detect a suspected fault) when the user operates any content on the home screen on the home page, for example, as shown in FIG. 17(a), the home screen displayed on the mobile phone cannot be switched within a specific time when the user touches a WeChat icon 170 on the home screen, the user may perceive that screen freezing occurs on the mobile phone. When the user perceives that screen freezing occurs on the mobile phone, as shown in FIG. 17(b), the user may press and hold a power key 171, so that the mobile phone displays a restart screen shown in FIG. 17(c). The user may touch a restart button 172 on the restart screen shown in FIG. 17(c) to forcibly restart the operating system of the mobile phone. For the mobile phone, according to the another terminal device troubleshooting method provided in this embodiment of this application, if the forced restart operation (this operation may restore the mobile phone to normal, for example, the user touches the restart button on the restart screen to forcibly restart the operating system of the mobile phone, so as to restore the mobile phone to normal) that is performed by the user and obtained by the mobile phone is the same as a predefined forced restart operation, and the mobile phone determines that the suspected fault occurs on the mobile phone before the mobile phone obtains the forced restart operation performed by the user, the mobile phone may determine that actual screen freezing occurs on the mobile phone, that is, screen freezing really occurs on the mobile phone.

The following describes, from a perspective of an Android operating system, specific implementation of the terminal device troubleshooting methods (including the terminal device troubleshooting method and the another terminal device troubleshooting method) provided in the embodiments of this application on a software hierarchy.

With reference to FIG. 1, FIG. 18 is a framework diagram of a software hierarchy for implementing a terminal device troubleshooting method (including the terminal device troubleshooting method and the another terminal device troubleshooting method in the foregoing embodiments) according to an embodiment of this application. In FIG. 18, a software layer 1 corresponds to the application program layer shown in FIG. 1. In the software layer 1, one or more points for detecting a suspected fault and a user operation (for example, an operation performed by a user on art application program) may be set. A software layer 2 corresponds to the application program framework layer and the system runtime library layer that are shown in FIG. 1. In the software layer 2, one or more points for detecting a suspected fault and a user operation (for example, an operation performed by the user on a home page) may also be set. A software layer 3 corresponds to the kernel layer shown in FIG. 1. In the software layer 3, one or more points for detecting a suspected fault and a user operation (which may be, for example, an operation performed by the user on a physical key such as a power key, a back key, a borne key, or a recent key) may also be set.

The terminal device troubleshooting methods, provided in the embodiments of this application may be implemented in the software layer 2. To be specific, the troubleshooting method may be implemented at an application program framework layer and the system runtime library layer. Specifically, software code for implementing the troubleshooting method may be a service at the application program framework layer and the system runtime library layer.

As shown in FIG. 18, the troubleshooting method may be implemented through cooperation of a plurality of functional modules, Specifically, the plurality of functional modules include a fault monitoring module 20 (configured to detect a suspected fault and a user operation). A fault decision module 21 (configured to determine whether an actual fault occurs on a terminal device or whether a suspected fault occurs on a terminal device) and a management and, access module 22 (configured to manage, access, and transmit a fault occurrence event and a fault occurrence log) that are connected to the fault monitoring module 20, and a fault rectification module 23 (configured to restore the terminal device to normal when an actual fault occurs on the terminal device) connected to the fault decision module 21. The fault decision module 21 and the management and access module 22 are connected. Further, in this embodiment of this application, a database 24 may be further set, and is configured to store the fault occurrence event, the fault occurrence log, and the like. In addition, in this embodiment of this application, after determining that a fault occurs on the terminal device, the terminal device may further send the fault occurrence event and the fault occurrence log to a cloud server. A cloud database shown in FIG. 18 may be set on the server, and is configured to store the fault occurrence event, the fault occurrence log, and the like that are received by the server.

The management and access module 22 shown in FIG. 18 includes a management submodule 220, an access submodule 221, and a sending submodule 222. The management submodule 220 and the access submodule 221 are connected. The management submodule 220 is configured to manage the fault occurrence event and the fault occurrence log. The access submodule 221 is configured to access the fault occurrence event and the fault occurrence log from the database 24. The sending submodule 222 is configured to send the fault occurrence event and the fault occurrence log to the cloud database.

The foregoing embodiments mainly describe the solutions provided in the embodiments of this application from a perspective of the terminal device (the terminal device may be the foregoing mobile phone). It can be understood that to implement the foregoing functions, the terminal device and the like provided in the embodiments of this application include a corresponding hardware structure and/or software module to perform each function. A person of ordinary skill in the art can easily be aware that with reference to the examples modules and algorithm steps described in the embodiments disclosed in this specification, the embodiments of this application can be implemented by hardware or a combination of hardware and computer software. Whether a function is performed by hardware or hardware driven by computer software depends on particular applications and design constraints of the technical solutions. A person skilled in the art may use a different method to implement the described functions for each particular application, but it should not be considered that the implementation goes beyond the scope of this application.

In the embodiments of this application, functional modules of the terminal device and the like may be exemplarily divided according to the foregoing methods. For example, the functional modules may be divided based on functions, or two or more modules may be integrated into one module. The integrated module may be implemented in a form of hardware, or may be implemented in a form of a software functional module. It should be noted that in this embodiment of this application, module division is an example, and is merely a logical function division. In actual implementation, another division manner may be used.

When the functional modules are divided based on corresponding functions, FIG. 19 is a possible schematic structural diagram of a terminal device according to an embodiment of this application. As shown in FIG. 19, the terminal device may include an obtaining module 30 and a determining module 31. The obtaining module 30 may be configured to support the terminal device in performing S102 and S202 performed by the terminal device in the foregoing method embodiments. The determining module 31 may be configured to support the terminal device in performing S105, S107, S109, S110, S204, S206, and S207 performed by the terminal device in the foregoing method embodiments. Optionally, with reference to FIG. 19, as shown in FIG. 20, the terminal device provided in this embodiment of this application may further include a detection module 32. The detection module 32 may be configured to support the terminal device in performing S101, S103, S104, S106, S108, S201, S203, and S205 performed by the terminal device in the foregoing method embodiments. Optionally, with reference to FIG. 20, as shown in FIG. 21, the terminal device provided in this embodiment of this application may further include a restoration module 33. The restoration module 33 may be configured to support the terminal device in performing S111 and S112 performed by the terminal device in the foregoing method embodiments.

Optionally, with reference to FIG. 19, the terminal device provided in this embodiment of this application may further include a sending module. The sending module may be configured to support the terminal device in performing S113 and S208 performed by the terminal device in the foregoing method embodiments. It can be understood that the foregoing functional modules may also perform another process of the technologies described in the embodiments of this application. All related content of the steps in the foregoing method embodiments can be referred in function descriptions of corresponding functional modules. Details are not described herein again.

It can be understood that in the foregoing embodiment in which the functional modules are divided based on corresponding functions, the obtaining module 30 and the detection module 32 are equivalent to the fault monitoring module 20 in the embodiment shown in FIG. 18; the determining module 31 is equivalent to the fault decision module 21 in the embodiment shown in FIG. 18; and the restoration module 33 is equivalent to the fault rectification module 23 in the embodiment shown in FIG. 18. It can be understood that the terminal device provided in this embodiment of this application may further include a storage module. The storage module is equivalent to the management and access module 22 in the embodiment shown in FIG. 18.

When the functional modules are integrated. FIG. 22 is a possible schematic structural diagram of a terminal device according to an embodiment of this application. As shown in FIG. 22, the terminal device may include a processing module 40 and a storage module 41. The processing module 40 may be configured to control and manage an action of the terminal device. For example, the processing module 40 may be configured to support the terminal device in performing S101, S102, S103, S104, S105, S106, S107, S108, S109, S110, S111, S112, S201, S202, S203, S204, S205, S206, and S207 performed by the terminal device in the foregoing method embodiments, and/or another process of the technologies described herein. The storage module 41 is configured to store program code and data of the terminal device. Optionally, as shown in FIG. 22, the terminal device may further include a communications module 42. The communications module 42 may be configured to support the terminal device in communicating with another device. For example, the communications module 42 may be configured to support the terminal device in interacting with another terminal device. In this embodiment of this application, the communications module 42 may be configured to support the terminal device in performing S113 and S208 performed by the terminal device in the foregoing method embodiments, and/or another process of the technologies described herein.

The processing module 40 may be a processor or a controller, such as may be a central processing unit (CPU), a general-purpose processor, a digital signal processor (DSP), an application-specific integrated circuit (ASIC), a field programmable gate array (FPGA), or another programmable logic device, a transistor logic device, a hardware component, or a combination thereof. The processor may implement or execute various example logical blocks, modules, and circuits described with reference to content disclosed in the present invention. Alternatively, the processor may be a combination of processors implementing a computing function, for example, a combination of one or more microprocessors, or a combination of the DSP and a microprocessor. The storage module 41 may be a memory. The memory may include a common storage device and a memory, the common storage device is configured to store a software program and/or a module of the terminal device, and the memory is used by the processor to load and run the software program of the terminal device. The communications module 42 may be a transceiver, a transceiver circuit, a communications interface, or the like.

For example, the processing module 40 may be the processor 10 shown in FIG. 2. The storage module 41 may be the memory 13 shown in FIG. 2. The communications module 42 may be the RF circuit 11 and/or the input module 14 and the like shown in FIG. 2.

When the processing module 40 is a processor, the storage module 41 is a memory, and the communications module 42 is a transceiver, FIG. 23 is a schematic diagram of hardware of a terminal device according to an embodiment of this application. As shown in FIG. 23, the terminal device includes a processor 50, a memory 51, and a transceiver 52. The processor 50, the memory 51, and the transceiver 52 may be connected to each other through a bus 53. The bus 53 may be a peripheral component interconnect (PCI) bus, an extended industry standard architecture (EISA) bus, and or the like. The bus 53 may be classified into an address bus, a data bus, a control bus, and the like.

All or some of the foregoing embodiments may be implemented by software, hardware, firmware, or any combination thereof. When a software program is used for implementation, some or all of the embodiments may be implemented in a form of a computer program product. The computer program product includes one or more computer instructions. When the computer instructions are loaded and executed on the computer, all or some of the procedures or functions according to the embodiments of this application are generated. The computer may be a general-purpose computer, a dedicated computer, a computer network, or other programmable apparatuses. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave) manner. The computer readable storage medium may be any usable medium accessible by a computer, or a data storage device, such as a server or a data center, integrating one or more usable media. The usable medium may be a magnetic medium (for example, a floppy disk, a magnetic disk, or a magnetic tape), an optical medium (for example, a digital video disc (DVD)), a semiconductor medium (for example, a solid-state drive (SSD)), or the like.

The foregoing descriptions about implementations allow a person skilled in the art to understand that for the purpose of convenient and brief description, division of the foregoing functional modules is taken as an example for illustration. In actual application, the foregoing functions can be allocated to different modules and implemented according to a requirement, that is, an inner structure of an apparatus is divided into different functional modules to implement all or some of the functions described above. For a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example.

For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, and may be located in one position, or may be distributed on a plurality of network units. Some or all of the units may be selected, based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in, a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, a network device, or the like) or a processor to perform all or some of the steps of the methods described in the embodiments of this application. The foregoing storage medium includes: any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, implemented by an electronic device, comprising:
    displaying a first user interface on a screen of the electronic device;
    detecting a first operation on the first user interface;
    detecting that the electronic device fails to respond to the first operation;
    detecting a plurality of consecutive operations on a key within a first time, wherein the key comprises at least one of a home key, a back key, or a power key; and
    determining that an actual fault occurs on the electronic device when the electronic device fails to respond to the plurality of consecutive operations.

2. The method of claim 1, wherein the failing to respond to the first operation comprises failing to switch to a second user interface.

3. The method of claim 2, wherein the failing to respond to the plurality of consecutive operations comprises failing to switch to the second user interface.

4. The method of claim 1, further comprising:
    detecting a second operation on the electronic device, wherein the second operation comprises at least one of a forced close operation for an application or a forced restart operation for an operating system of the electronic device;
    determining that the actual fault occurs on the electronic device in response to the second operation.

5. The method of claim 1, further comprising:
    determining whether a suspected fault occurs on the electronic device according to at least one of central processing unit or memory usage of the electronic device.

6. The method of claim 5, further comprising:
    determining that the actual fault is caused by the suspected fault.

7. The method of claim 1, further comprising:
    forcibly closing a first application program in response to determining that an actual fault occurs on the electronic device.

8. The method of claim 1, further comprising:
    forcibly restarting an operating system of the terminal device in response to determining that an actual fault occurs on the electronic device.

9. An electronic device, comprising:
    at least one processor; and
    a memory coupled to the at least one processor and configured to store programming instructions that, when executed by the at least one processor, cause the electronic device to perform operations comprising:
    displaying a first user interface on a screen of the electronic device;
    detecting a first operation on the first user interface;
    detecting that the electronic device fails to respond to the first operation;
    detecting a plurality of consecutive operations on a key within a first time, wherein the key comprises at least one of a home key, a back key, or a power key; and
    determining that an actual fault occurs on the electronic device when the electronic device fails to respond to the plurality of consecutive operations.

10. The electronic device of claim 9, wherein the failing to respond to the first operation comprises failing to switch to a second user interface.

11. The electronic device of claim 10, wherein the failing to respond to the plurality of consecutive operations comprises failing to switch to the second user interface.

12. The electronic device of claim 9, wherein the operations further comprise:
    detecting a second operation on the electronic device, wherein the second operation comprises at least one of a forced close operation for an application or a forced restart operation for an operating system of the electronic device;
    determining that the actual fault occurs on the electronic device in response to the second operation.

13. The electronic device of claim 9, wherein the operations further comprise:
    determining whether a suspected fault occurs on the electronic device according to at least one of central processing unit or memory usage of the electronic device.

14. The electronic device of claim 13, further comprising:
    determining that the actual fault is caused by the suspected fault.

15. The electronic device of claim 9, wherein the operations further comprise:
    forcibly closing a first application program in response to determining that an actual fault occurs on the electronic device.

16. The electronic device of claim 9, wherein the operations further comprise:
    forcibly restarting an operating system of the terminal device in response to determining that an actual fault occurs on the electronic device.

17. A non-transitory computer readable medium configured to store instructions that, when executed by at least one processor of an electronic device, cause the electronic device to perform operations comprising:
    displaying a first user interface on a screen of the electronic device;
    detecting a first operation on the first user interface;
    detecting that the electronic device fails to respond to the first operation;
    detecting a plurality of consecutive operations on a key within a first time, wherein the key comprises at least one of a home key, a back key, or a power key; and determining that an actual fault occurs on the electronic device when the electronic device fails to respond to the plurality of consecutive operations.

18. The non-transitory computer readable medium of claim 17, wherein the failing to respond to the first operation comprises failing to switch to a second user interface.

19. The non-transitory computer readable medium of claim 18, wherein the failing to respond to the plurality of consecutive operations comprises failing to switch to the second user interface.

20. The non-transitory computer readable medium of claim 17, wherein the operations further comprise:
   detecting a second operation on the electronic device, wherein the second operation comprises at least one of a forced close operation for an application or a forced restart operation for an operating system of the electronic device;
   determining that the actual fault occurs on the electronic device in response to the second operation.

* * * * *